(12) United States Patent
Hoshuyama

(10) Patent No.: US 7,768,555 B2
(45) Date of Patent: Aug. 3, 2010

(54) IMAGE PROCESSING APPARATUS, IMAGE PROCESSING PROGRAM, AND IMAGE PROCESSING METHOD

(75) Inventor: Hideo Hoshuyama, Kawasaki (JP)

(73) Assignee: Nixon Corporaion, Tokyo (JP)

(*) Notice: Subject to any disclaimer, the term of this patent is extended or adjusted under 35 U.S.C. 154(b) by 0 days.

(21) Appl. No.: 12/385,545

(22) Filed: Apr. 10, 2009

(65) Prior Publication Data

US 2009/0225187 A1    Sep. 10, 2009

Related U.S. Application Data

(62) Division of application No. 10/352,906, filed on Jan. 29, 2003, now Pat. No. 7,535,503.

(30) Foreign Application Priority Data

Feb. 1, 2002    (JP)    ............... 2002-025714
Feb. 1, 2002    (JP)    ............... 2002-025715

(51) Int. Cl.
    *H04N 9/73*    (2006.01)
    *H04N 5/208*    (2006.01)
(52) U.S. Cl. .................. 348/223.1; 348/252
(58) Field of Classification Search ............. 348/227.1, 348/223.1, 370, 371, 252, 365, 625, 627
    See application file for complete search history.

(56) References Cited

U.S. PATENT DOCUMENTS

| | | | |
|---|---|---|---|
| 5,404,165 A | 4/1995 | Ohtsubo et al. | |
| 5,805,213 A | 9/1998 | Spaulding et al. | |
| 5,815,204 A * | 9/1998 | Abe et al. | ................ 348/371 |
| 5,838,371 A | 11/1998 | Hirose et al. | |
| 5,953,058 A * | 9/1999 | Hanagata | ................ 348/223.1 |
| 6,563,602 B1 * | 5/2003 | Uratani et al. | ................ 358/1.9 |
| 6,628,833 B1 | 9/2003 | Horie | |
| 6,724,941 B1 | 4/2004 | Aoyama | |
| 6,788,339 B1 * | 9/2004 | Ikeda | ................ 348/223.1 |
| 2002/0085100 A1 | 7/2002 | Takahashi | |

FOREIGN PATENT DOCUMENTS

| | | |
|---|---|---|
| JP | A-61-251379 | 11/1986 |
| JP | A-03-155292 | 7/1991 |
| JP | B2-2692151 | 9/1997 |
| JP | A-10-079888 | 3/1998 |
| JP | A-11-088896 | 3/1999 |

(Continued)

OTHER PUBLICATIONS

Sato. English language translation of Aug. 13, 2007 Japanese Office Action in Japanese Application 2002-025714, pp. 1-3, JPO.

*Primary Examiner*—Jason Chan
*Assistant Examiner*—Nicholas G Giles
(74) *Attorney, Agent, or Firm*—Oliff & Berridge, PLC

(57) ABSTRACT

An image processing apparatus of the present invention can perform appropriate edge enhancement processing on any image while preventing increases in noise and chromatic aberration in the process of image processing. The image processing apparatus obtains photographic information present at generation of the image, determines, based on the photographic information, an edge enhancement coefficient to be used in performing edge enhancement processing, and performs edge enhancement processing to the image using the determined coefficient. Further, an image processing method of the present invention makes it possible to perform appropriate edge enhancement processing on any image while preventing increases in noise and chromatic aberration in the process of image processing.

10 Claims, 20 Drawing Sheets

| Edge Enhancement Degree | | Color Temperature | | | | | |
|---|---|---|---|---|---|---|---|
| | | 3000K | 4000K | 5000K | 6000K | 7000K | 8000K |
| Contrast Data | 1 | 4.4 | 4.5 | 4.4 | 4.0 | 4.0 | 4.0 |
| | 2 | 4.7 | 4.8 | 4.7 | 4.5 | 4.2 | 4.0 |
| | 3 | 5.1 | 5.2 | 5.1 | 5.0 | 4.8 | 4.2 |
| | 4 | 5.5 | 5.6 | 5.5 | 5.4 | 5.0 | 4.6 |
| | 5 | 6.0 | 6.0 | 6.0 | 5.9 | 5.5 | 5.0 |
| | 6 | 6.5 | 6.5 | 6.5 | 6.0 | 5.6 | 5.3 |
| | 7 | 6.5 | 7.0 | 6.5 | 6.1 | 5.7 | 5.4 |

FOREIGN PATENT DOCUMENTS

| | | |
|---|---|---|
| JP | A-11-112837 | 4/1999 |
| JP | A-11-168737 | 6/1999 |
| JP | A-2000-115539 | 4/2000 |
| JP | A-2001-054014 | 2/2001 |
| JP | A-2001-078085 | 3/2001 |
| JP | A-2001-251549 | 9/2001 |
| JP | A-2001-311867 | 11/2001 |
| JP | A-2002-034053 | 1/2002 |

* cited by examiner

FIG.3B

| ISO Speed 200~399 | | Tone Curve Number | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Matrix Number | 0 | 4 | 4 | 5 | 5 | 6 | 7 | 7 | 8 | 9 | 8 | 7 | 7 | 6 | 6 | 5 | 5 |
| | 1 | 4 | 4 | 5 | 5 | 6 | 6 | 7 | 7 | 8 | 7 | 7 | 6 | 6 | 5 | 5 | 4 |
| | 2 | 4 | 4 | 4 | 5 | 5 | 6 | 6 | 7 | 7 | 7 | 6 | 6 | 5 | 5 | 4 | 4 |
| | 3 | 3 | 3 | 4 | 4 | 5 | 5 | 6 | 6 | 7 | 6 | 6 | 5 | 5 | 4 | 4 | 3 |
| | 4 | 3 | 3 | 3 | 4 | 4 | 5 | 5 | 6 | 6 | 6 | 5 | 5 | 4 | 4 | 3 | 3 |
| | 5 | 3 | 3 | 3 | 4 | 4 | 4 | 5 | 5 | 6 | 5 | 5 | 4 | 4 | 3 | 3 | 2 |
| | 6 | 3 | 3 | 3 | 3 | 4 | 4 | 4 | 5 | 5 | 5 | 4 | 4 | 3 | 3 | 2 | 2 |
| | 7 | 3 | 3 | 3 | 3 | 4 | 4 | 4 | 4 | 5 | 4 | 4 | 3 | 3 | 2 | 2 | 2 |

| ISO Speed 400~799 | | Tone Curve Number | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Matrix Number | 0 | 3 | 3 | 4 | 4 | 5 | 6 | 6 | 7 | 8 | 7 | 6 | 6 | 5 | 5 | 4 | 4 |
| | 1 | 3 | 3 | 4 | 4 | 5 | 5 | 6 | 6 | 7 | 6 | 6 | 5 | 5 | 4 | 4 | 3 |
| | 2 | 3 | 3 | 3 | 4 | 4 | 5 | 5 | 6 | 6 | 6 | 5 | 5 | 4 | 4 | 3 | 3 |
| | 3 | 2 | 2 | 3 | 3 | 4 | 4 | 5 | 5 | 6 | 5 | 5 | 4 | 4 | 3 | 3 | 2 |
| | 4 | 2 | 2 | 2 | 3 | 3 | 4 | 4 | 5 | 5 | 5 | 4 | 4 | 3 | 3 | 2 | 2 |
| | 5 | 2 | 2 | 2 | 3 | 3 | 3 | 4 | 4 | 5 | 4 | 4 | 3 | 3 | 2 | 2 | 1 |
| | 6 | 2 | 2 | 2 | 2 | 3 | 3 | 3 | 4 | 4 | 4 | 3 | 3 | 2 | 2 | 1 | 1 |
| | 7 | 2 | 2 | 2 | 2 | 3 | 3 | 3 | 3 | 4 | 3 | 3 | 2 | 2 | 1 | 1 | 1 |

| ISO Speed 800~1600 | | Tone Curve Number | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Matrix Number | 0 | 1 | 1 | 2 | 2 | 3 | 4 | 4 | 5 | 6 | 5 | 4 | 4 | 3 | 3 | 2 | 2 |
| | 1 | 1 | 1 | 2 | 2 | 3 | 3 | 4 | 4 | 5 | 4 | 4 | 3 | 3 | 2 | 2 | 1 |
| | 2 | 1 | 1 | 1 | 2 | 2 | 3 | 3 | 4 | 4 | 4 | 3 | 3 | 2 | 2 | 1 | 1 |
| | 3 | 0 | 0 | 1 | 1 | 2 | 2 | 3 | 3 | 4 | 3 | 3 | 2 | 2 | 1 | 1 | 0 |
| | 4 | 0 | 0 | 0 | 1 | 1 | 2 | 2 | 3 | 3 | 3 | 2 | 2 | 1 | 1 | 0 | 0 |
| | 5 | 0 | 0 | 0 | 1 | 1 | 1 | 2 | 2 | 3 | 2 | 2 | 1 | 1 | 0 | 0 | 0 |
| | 6 | 0 | 0 | 0 | 0 | 1 | 1 | 1 | 2 | 2 | 2 | 1 | 1 | 0 | 0 | 0 | 0 |
| | 7 | 0 | 0 | 0 | 0 | 1 | 1 | 1 | 1 | 2 | 1 | 1 | 0 | 0 | 0 | 0 | 0 |

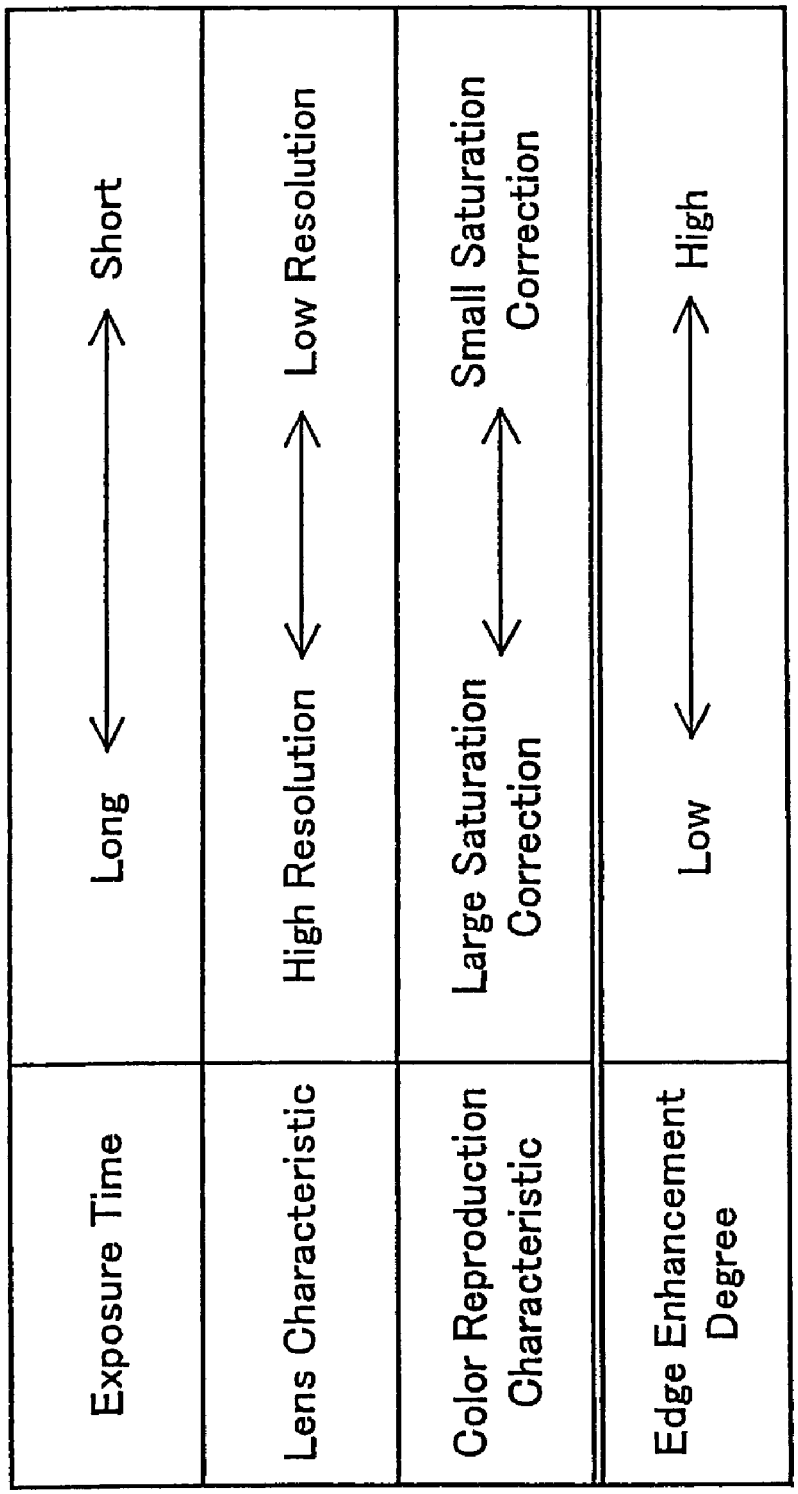

FIG.5B

| MTF 70~100(%) | Exposure Time (sec.) | | | | | | | | | |
|---|---|---|---|---|---|---|---|---|---|---|
| | | 16 or longer | 8 | 4 | 2 | 1 | 1/2 | 1/4 | 1/8 | 1/15 | 1/30 or shorter |
| Matrix Number | 0 | 5 | 5 | 5 | 6 | 6 | 6 | 6 | 6 | 8 | 9 |
| | 1 | 4 | 4 | 5 | 5 | 5 | 5 | 6 | 6 | 7 | 8 |
| | 2 | 4 | 4 | 4 | 4 | 4 | 5 | 5 | 5 | 6 | 8 |
| | 3 | 3 | 3 | 3 | 4 | 4 | 4 | 4 | 4 | 6 | 7 |
| | 4 | 2 | 2 | 3 | 3 | 3 | 3 | 4 | 4 | 5 | 7 |
| | 5 | 1 | 2 | 2 | 2 | 2 | 3 | 3 | 3 | 4 | 6 |
| | 6 | 1 | 1 | 1 | 2 | 2 | 2 | 2 | 2 | 4 | 6 |
| | 7 | 0 | 0 | 1 | 1 | 1 | 1 | 2 | 2 | 3 | 5 |

| MTF 50~69(%) | Exposure Time (sec.) | | | | | | | | | |
|---|---|---|---|---|---|---|---|---|---|---|
| | | 16 or longer | 8 | 4 | 2 | 1 | 1/2 | 1/4 | 1/8 | 1/15 | 1/30 or shorter |
| Matrix Number | 0 | 6 | 6 | 6 | 7 | 7 | 7 | 7 | 7 | 9 | 9 |
| | 1 | 5 | 5 | 6 | 6 | 6 | 6 | 7 | 7 | 8 | 9 |
| | 2 | 5 | 5 | 5 | 5 | 5 | 6 | 6 | 6 | 7 | 9 |
| | 3 | 4 | 4 | 4 | 5 | 5 | 5 | 5 | 5 | 7 | 8 |
| | 4 | 3 | 3 | 4 | 4 | 4 | 4 | 5 | 5 | 6 | 8 |
| | 5 | 2 | 3 | 3 | 3 | 3 | 4 | 4 | 4 | 5 | 7 |
| | 6 | 2 | 2 | 2 | 2 | 3 | 3 | 3 | 3 | 5 | 7 |
| | 7 | 1 | 1 | 2 | 2 | 2 | 2 | 3 | 3 | 4 | 6 |

| MTF 0~49(%) | Exposure Time (sec.) | | | | | | | | | |
|---|---|---|---|---|---|---|---|---|---|---|
| | | 16 or longer | 8 | 4 | 2 | 1 | 1/2 | 1/4 | 1/8 | 1/15 | 1/30 or shorter |
| Matrix Number | 0 | 8 | 8 | 8 | 9 | 9 | 9 | 9 | 9 | 9 | 9 |
| | 1 | 7 | 7 | 8 | 8 | 8 | 8 | 9 | 9 | 9 | 9 |
| | 2 | 7 | 7 | 7 | 7 | 7 | 8 | 8 | 8 | 9 | 9 |
| | 3 | 6 | 6 | 6 | 7 | 7 | 7 | 7 | 7 | 9 | 9 |
| | 4 | 5 | 5 | 6 | 6 | 6 | 6 | 7 | 7 | 8 | 9 |
| | 5 | 4 | 5 | 5 | 5 | 5 | 6 | 6 | 6 | 7 | 9 |
| | 6 | 4 | 4 | 4 | 4 | 5 | 5 | 5 | 5 | 7 | 9 |
| | 7 | 3 | 3 | 4 | 4 | 4 | 4 | 5 | 5 | 6 | 9 |

MTF in Table refers to 10 Spatial Frequencies/mm

FIG.7A

| Flash Device | ON $\longleftrightarrow$ OFF | |
|---|---|---|
| Gradation Translation Characteristic | Small or Big Gradation Change $\longleftrightarrow$ | Normal Gradation Change |
| Edge Enhancement Degree | Low $\longleftrightarrow$ | High |

FIG.7B

| | | Tone Curve Number | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Flash Device | ON | 2 | 2 | 3 | 3 | 4 | 4 | 5 | 5 | 4 | 4 | 3 | 3 | 2 | 2 | 2 | 2 |
| | OFF | 3 | 3 | 4 | 4 | 5 | 5 | 6 | 6 | 5 | 5 | 4 | 4 | 3 | 3 | 3 | 3 |

FIG.11

| Smoothing Degree | | Color Temperature | | | | | |
|---|---|---|---|---|---|---|---|
| | | 3000K | 4000K | 5000K | 6000K | 7000K | 8000K |
| Contrast Data | 1 | 4.2 | 4.1 | 4.2 | 4.6 | 4.6 | 4.6 |
| | 2 | 3.9 | 3.7 | 3.9 | 4.1 | 4.4 | 4.6 |
| | 3 | 3.4 | 3.3 | 3.4 | 3.5 | 3.7 | 4.4 |
| | 4 | 3.0 | 2.9 | 3.0 | 3.1 | 3.5 | 4.0 |
| | 5 | 2.5 | 2.5 | 2.5 | 2.6 | 3.0 | 3.5 |
| | 6 | 2.1 | 2.1 | 2.1 | 2.5 | 2.9 | 3.2 |
| | 7 | 2.1 | 1.6 | 2.1 | 2.4 | 2.8 | 3.1 |

FIG.13

| Edge Enhancement Degree | | Color Temperature | | | | | |
|---|---|---|---|---|---|---|---|
| | | 3000K | 4000K | 5000K | 6000K | 7000K | 8000K |
| Contrast Data | 1 | 4.4 | 4.5 | 4.4 | 4.0 | 4.0 | 4.0 |
| | 2 | 4.7 | 4.8 | 4.7 | 4.5 | 4.2 | 4.0 |
| | 3 | 5.1 | 5.2 | 5.1 | 5.0 | 4.8 | 4.2 |
| | 4 | 5.5 | 5.6 | 5.5 | 5.4 | 5.0 | 4.6 |
| | 5 | 6.0 | 6.0 | 6.0 | 5.9 | 5.5 | 5.0 |
| | 6 | 6.5 | 6.5 | 6.5 | 6.0 | 5.6 | 5.3 |
| | 7 | 6.5 | 7.0 | 6.5 | 6.1 | 5.7 | 5.4 |

FIG.16

| Color Temperature (Kelvin) | Smoothing Coefficient (F) |
|---|---|
| ... | ... |
| 2000 | $F_{2000}$ |
| 3000 | $F_{3000}$ |
| 4000 | $F_{4000}$ |
| 5000 | $F_{5000}$ |
| 6000 | $F_{6000}$ |
| 7000 | $F_{7000}$ |
| 8000 | $F_{8000}$ |
| ... | ... |

FIG.17

| Color Temperature (Kelvin) | Edge Enhancement Coefficient (E) |
|---|---|
| . . . | . . . |
| 2000 | $E_{2000}$ |
| 3000 | $E_{3000}$ |
| 4000 | $E_{4000}$ |
| 5000 | $E_{5000}$ |
| 6000 | $E_{6000}$ |
| 7000 | $E_{7000}$ |
| 8000 | $E_{8000}$ |
| . . . | . . . |

IMAGE PROCESSING APPARATUS, IMAGE PROCESSING PROGRAM, AND IMAGE PROCESSING METHOD

This is a Division of application Ser. No. 10/352,906 filed Jan. 29, 2003 now U.S. Pat. No. 7,535,503. This application claims the benefit of Japanese Patent Application Nos. 2002-025714 filed Feb. 1, 2002 and 2002-025715 filed Feb. 1, 2002. The entire disclosures of the prior applications are hereby incorporated by reference herein in their entirety.

BACKGROUND OF THE INVENTION

1. Field of the Invention

The present invention relates to an image processing apparatus for performing at least edge enhancement processing to an image, and an image processing program and an image processing method thereof.

2. Description of the Related Art

Some digital still cameras have an image processing unit for realizing a function of an image processing apparatus by performing various image processing to generated images. Such an image processing unit performs white balance adjustment, interpolation processing, gamma processing, edge enhancement processing, and the like. In particular, the edge enhancement processing effectively improves image quality and the like. On the other hand, however, edge enhancement processing has disadvantages such as increases in noise and chromatic aberration.

Conventionally, therefore, edge enhancement processing has been performed using a predetermined fixed edge enhancement coefficient with factors having effects on edge enhancement processing (for example, sensitivity and exposure time set at generation of an image, a gradation translation characteristic for the image, and the like) taken into consideration, or edge enhancement processing has been performed using an edge enhancement coefficient according to a degree of enhancement degree set by a user.

However, the fixed edge enhancement coefficient and the edge enhancement coefficient according to the enhancement degree set by the user are set for use in typical setting conditions at the time of photographing. Accordingly, when values of any of the factors having effects on the edge enhancement processing do not fall within values used in the typical setting conditions, it is difficult to prevent noise and chromatic aberration from getting worse.

For example, in performing the edge enhancement processing on an image which is captured with a higher sensitivity, the image has more noise therein than an image captured with a normal sensitivity, therefore, increasing noise cannot be prevented even using the aforesaid fixed edge enhancement coefficient.

Further, when an image has a low saturation, the conventional image processing unit of the digital still camera performs color reproduction processing on the image such that the image has a more vivid color reproduction characteristic than an image having a normal saturation, which results in amplifying chromatic aberration. Therefore, even if the aforesaid fixed edge enhancement coefficient is used for an image with an amplified chromatic aberration, it is hard to prevent chromatic aberration from getting worse.

Furthermore, the fixed edge enhancement coefficient is determined without the presence or absence of a flash from a flash device when an image is captured taken into account so that it is difficult to prevent increases in noise and chromatic aberration depending on the presence or absence of the flash of the flash device.

The same problems arise when the edge enhancement processing is performed using the edge enhancement coefficients according to the enhancement degree set by the user, and when values of any of the factors having effects on the edge enhancement processing do not fall within values used in the typical setting conditions, because the coefficients are determined according to the degree of edge enhancement used in the typical setting conditions.

In addition, the image processing unit of the conventional digital still camera performs processing of multiplying a white balance coefficient for white balance adjustment, noise included in inputted image data may be also amplified. Further, the multiplying processing is made also for gamma processing and edge enhancement processing, which increase noise in some cases. In particular, increases in the noise arising from the edge enhancement processing are larger than from other image processings. Note that at the time of performing interpolation and smoothing processings noise may be cancelled and reduced due to averaging done in the process.

Further, image processings as described above are independently performed in the conventional digital still camera. Accordingly, the coefficients used for the respective image processing are not correlated with each other, and because of this, such problems occur as noise is increased in the process of the white balance adjustment, and the increased noise is further increased by performing subsequent edge enhancement processing without the increase taken into account.

Some conventional digital still cameras determine a color correction coefficient according to color temperature of a subject or select a tone curve used for gamma processing according to contrast of the subject, but even these cameras may increase noise because the edge enhancement processing is independently performed.

SUMMARY OF THE INVENTION

A first object of the present invention is to provide an image processing apparatus capable of performing appropriate edge enhancement processing on any image as well as preventing increase in noise and chromatic aberration in the process of processing the image.

A second object of the present invention is to provide an image processing program for performing appropriate edge enhancement processing on any image as well as preventing increase in noise and chromatic aberration in the process of processing the image.

A third object of the present invention is to provide an image processing method for performing appropriate edge enhancement processing on any image as well as preventing increase in noise and chromatic aberration in the process of processing the image.

In order to achieve the first object described above, the image processing apparatus of the present invention comprises: a coefficient determining part for obtaining photographic information present at generation of an image to determine an edge enhancement coefficient based on the photographic information, the edge enhancement coefficient being used for performing edge enhancement processing; and an image processing part for performing the edge enhancement processing on the image using the edge enhancement coefficient determined by the coefficient determining part.

Further, in order to achieve the second object described above, the image processing program of the present invention comprises the steps of: obtaining photographic information present at generation of an image to determine an edge enhancement coefficient based on the photographic information, the edge enhancement coefficient being used for performing edge enhancement processing; and performing the edge enhancement processing on the image using the edge enhancement coefficient determined by the coefficient determining step.

Furthermore, in order to achieve the third object described above, the image processing method of the present invention comprises the steps of: obtaining photographic information present at generation of an image to determine an edge enhancement coefficient based on the photographic information, the edge enhancement coefficient being used for performing edge enhancement; and performing the edge enhancement processing on the image using the edge enhancement coefficient determined in the coefficient determining step.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3B is an example of an LUT used in determining the edge enhancement degree in the first embodiment;

FIG. 5A is a table showing the relationship between photographic information and edge enhancement degree in the second embodiment;

FIG. 5B is an example of an LUT used in determining the edge enhancement degree in the second embodiment;

FIG. 7A is a table showing the relationship between photographic information and edge enhancement degree in the third embodiment;

FIG. 7B is an example of an LUT used in determining the edge enhancement degree in the third embodiment;

FIG. 11 is an example of an LUT used in determining smoothing degree;

FIG. 13 is an example of an LUT in determining edge enhancement degree;

FIG. 16 is an example of an LUT used in determining smoothing degree;

FIG. 17 is an example of an LUT used in determining edge enhancement degree.

DESCRIPTION OF THE PREFERRED EMBODIMENTS

Hereinafter embodiments of the present invention will be explained in detail with reference to the drawings.

It should be noted that each of the embodiments below explains a digital still camera which has an image processing function performed by an image processing apparatus of the present invention.

Explanation of First Embodiment

A first embodiment of the present invention will be explained below with reference to the drawings.

The first embodiment describes an example when photographic information is sensitivity, a color reproduction characteristic, and a gradation translation characteristic.

Figure 1:
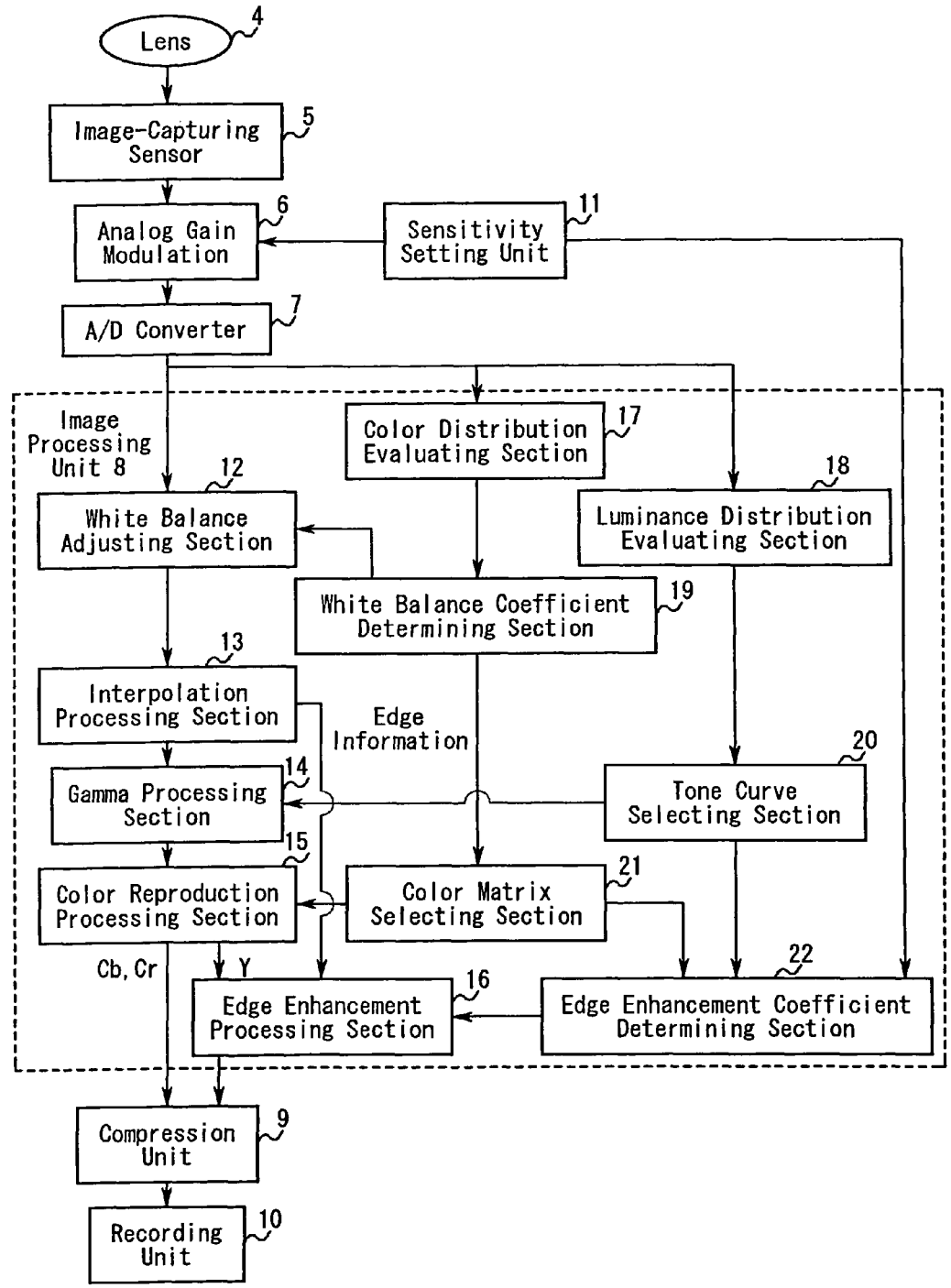
FIG. 1 is a diagram showing the schematic structure of a digital still camera of a first embodiment and function blocks of an image processing unit in the digital still camera.

FIG. 1 is a diagram showing the schematic structure of a digital still camera in the first embodiment and function blocks of an image processing unit in the digital still camera.

In FIG. 1, a digital still camera 1 has a lens 4, an image-capturing sensor 5, an analog gain modulation 6, an A/D converter 7, an image processing unit 8, a compression unit 9, a recording unit 10, and a sensitivity setting unit 11. An output of the image-capturing sensor 5 is connected to the analog gain modulation 6, an output of the analog gain modulation 6 is connected to the A/D converter 7, and an output of the A/D converter 7 is connected to the image processing unit 8. An output of the image processing unit 8 is connected to the compression unit 9, and an output of the compression unit 9 is connected to the recording unit 10.

Here, since sensitivity set by the sensitivity setting unit 11 is used for determining an edge enhancement coefficient which will be described later, an output of the sensitivity setting unit 11 is connected to the analog gain modulation 6 as well as to the image processing unit 8 in FIG. 1.

In the digital still camera 1 thus structured, image data obtained by the image-capturing sensor 5 through the lens 4 is amplified in the analog gain modulation 6 according to the sensitivity set by the sensitivity setting unit 11, converted to a digital signal in the A/D converter 7, and subjected to image processing in the image processing unit 8. Then, when the image processing is completed, the data after the image processing is supplied to the compression unit 9 and the recording unit 10.

Note that the sensitivity is set by the sensitivity setting unit 11 here, but it may be set by a user via a not-shown operating unit, or may be set by the sensitivity setting unit 11 according to photometry information from a not-shown photometry unit or the like. Further, the digital still camera 1 stores a program indicating operation procedures of each unit in advance, however, the program may be recorded on a medium or downloaded as a transmission wave via the Internet.

In the image processing unit 8 of the digital still camera 1 in FIG. 1, a white balance adjusting section 12, an interpolation processing section 13, a gamma processing section 14, a color reproduction processing section 15, and an edge enhancement processing section 16 are included.

Furthermore, in order to determine a coefficient (including a color matrix number and a tone curve number) to be used for image processing in each of these sections, a color distribution evaluating section 17, a luminance distribution evaluating section 18, a white balance coefficient determining section 19, a tone curve selecting section 20, a color matrix selecting section 21, and an edge enhancement coefficient determining section 22 are included in the image processing unit 8.

Hereinafter, the operation of the image processing unit 8 will be explained with reference to FIG. 1 and a flow chart in FIG. 2.

Figure 2:
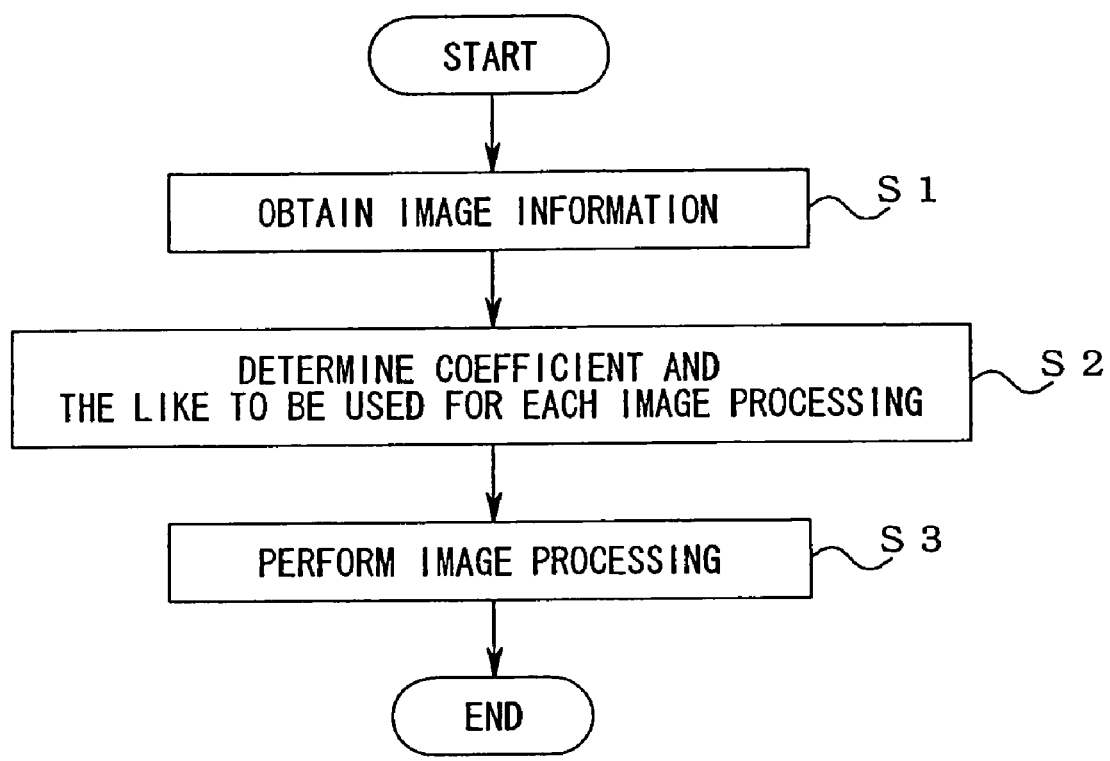
FIG. 2 is a flow chart showing the operation of the image processing unit in the digital still camera of the first embodiment.

As shown in FIG. 2, the image processing unit 8 first obtains photographic information (step S1), and determines a coefficient and the like to be used for each image processing based on the obtained photographic information (step S2). Then, using the coefficient and the like determined in step S2, the image processing unit 8 performs image processing to an image (step S3). Here, the characteristics of the present invention lie in the way of determining the coefficient to be used for each image processing in the image processing unit 8 (step S1 and step S2 in FIG. 2), and the way of performing each image processing (step S3 in FIG. 2) is the same as the known art. Therefore, how image processing is executed will be first explained briefly, and then in what way the coefficient to be used for each image processing is determined will be explained in detail.

In the image processing unit 8, the white balance adjusting section 12 makes white balance adjustment to image data inputted from the A/D converter 7, using a white balance coefficient which the white balance coefficient determining section 19 determines according to a method which will be described later. The interpolation processing section 13 divides the white-balance adjusted image data into edges and a smooth portion and then performs interpolation processing.

Next, the gamma processing section performs gamma processing, using a tone curve associated with a tone curve number which the tone curve selecting section 20 selects according to a method which will be described later from plural tone curves previously recorded in the gamma processing section 14.

Further, the color reproduction processing section 15 performs color reproduction processing, using a color matrix associated with a matrix number which the color matrix selecting section 21 selects according to a method which will be described later from plural color matrixes previously recorded in the color reproduction processing section 15.

Then, the edge enhancement processing section 16 performs edge enhancement processing on image data indicating luminance element (corresponding to a Y element in a YCbCr color system) out of image data on which the color reproduction processing has been performed. When such edge enhancement processing is performed, information, which is generated for dividing the image data into the edges and the smooth portion in the process of the interpolation processing described above, is used (edge information in FIG. 1).

Hereinafter, methods of obtaining the photographic information and of determining the coefficient to be used for each image processing will be explained in detail.

<Determining White Balance Coefficient>

The white balance coefficient to be used for white balance adjustment is determined by the white balance coefficient determining section 19 based on color temperature. The color distribution evaluating section 17 evaluates color distribution in an image based on the image data inputted from the A/D converter 7 and supplies it to the white balance coefficient determining section 19. The white balance coefficient determining section 19 determines color temperature based on the information obtained from the color distribution evaluating section 17 (an evaluation value of color distribution in the image), and determines the white balance coefficient based on the determined color temperature. The white balance coefficient determining section 19 supplies the determined white balance coefficient to the white balance adjusting section 12 as well as supplies the color temperature determined in determining the white balance coefficient to the color matrix selecting section 21.

<Determining Coefficient to be Used for Interpolation>

The coefficient to be used for interpolation is predetermined in the interpolation processing section 13 based on a characteristic of the image-capturing sensor 5.

<Determining Tone Curve Number>

The tone curve number indicating a tone curve to be used for gamma processing is determined by the tone curve selecting section 20 based on luminance distribution in an image. The tone curve is selected by the same method as that disclosed in Japanese Unexamined Patent Application Publication No. 2001-54014.

The luminance distribution evaluating section 18 first evaluates luminance distribution in an image based on the image data inputted from the A/D converter 7 and supplies it to the tone curve selecting section 20. The tone curve selecting section 20 determines a tone curve number to select a tone curve to be used based on the information obtained from the luminance distribution evaluating section 18 (an evaluating value of luminance distribution in the image). The tone curve selecting section 20 then supplies the determined tone curve number to the gamma processing section 14 as well as to the edge enhancement coefficient determining section 22.

<Determining Matrix Number>

The matrix number indicating a color matrix to be used for color reproduction processing is determined by the color matrix selecting section 21 based on the color temperature determined by the white balance coefficient determining section 19. The color matrix selecting section 21 determines a matrix number to select a color matrix to be used based on the color temperature determined by the white balance coefficient determining section 19, similarly to the method disclosed in the U.S. Pat. No. 5,805,213. Then, the color matrix selecting section 21 supplies the determined matrix number to the color reproduction processing section 15 as well as to the edge enhancement coefficient determining section 22.

<Determining Edge Enhancement Coefficient>

The edge enhancement coefficient to be used for edge enhancement processing is determined in the edge enhancement coefficient determining section 22 based on the sensitivity, the tone curve number, and the matrix number described above.

The edge enhancement coefficient determining section 22 first determines edge enhancement degree.

Here, the relationship between each piece of the photographic information (the sensitivity, the color reproduction characteristic, and the gradation translation characteristic) and the edge enhancement degree will be explained.

When the sensitivity is high, a gain multiplied in the analog gain modulation 6 is higher than when the sensitivity is normal, and therefore noise will be amplified with a higher degree. Accordingly, by determining the edge enhancement degree to be low, noise can be prevented from amplifying. On the other hand, when the sensitivity is low, the gain multiplied in the analog gain modulation 6 is lower than the sensitivity is normal, and therefore noise will be amplified with a low degree. Accordingly, by determining the edge enhancement degree to be high, an image of higher sharpness can be obtained.

Further, when the color reproduction characteristic in the color reproduction processing section 15 indicates color reproduction with a large saturation correction, a more vivid color reproduction characteristic will be obtained in the color reproduction processing section 15 than when it is a normal color reproduction characteristic, which increases an amplification degree of chromatic aberration. Accordingly, by determining the edge enhancement degree to be low, the chromatic aberration can be prevented from amplifying. On the other hand, when the color reproduction characteristic in the color reproduction processing section indicates color reproduction with a small saturation correction, the amplification degree of chromatic aberration will be lower than when it is the normal color reproduction characteristic. Accordingly, by determining the edge enhancement degree to be high, the image of higher sharpness can be obtained.

Furthermore, when the gradation translation characteristic in the gamma processing section 14 reduces a change in gradation, the amplification degree of noise in a black side increases more than when it is a normal gradation translation characteristic. Accordingly, by determining the edge enhancement degree to be low, noise can be prevented from amplifying. Moreover, when the gradation translation characteristic in the gamma processing section 14 increases the change in gradation, the amplification degree of noise in an intermediate area to a white side increases more than it is the normal gradation translation characteristic. Accordingly, by determining the edge enhancement degree to be low, noise can be prevented from amplifying. On the other hand, when the gradation translation characteristic in the gamma processing section 14 is normal, the amplification degree of noise due to gradation translation processing is low. Accordingly, by determining the edge enhancement degree to be high, the image of higher sharpness can be obtained.

Figure 3A:
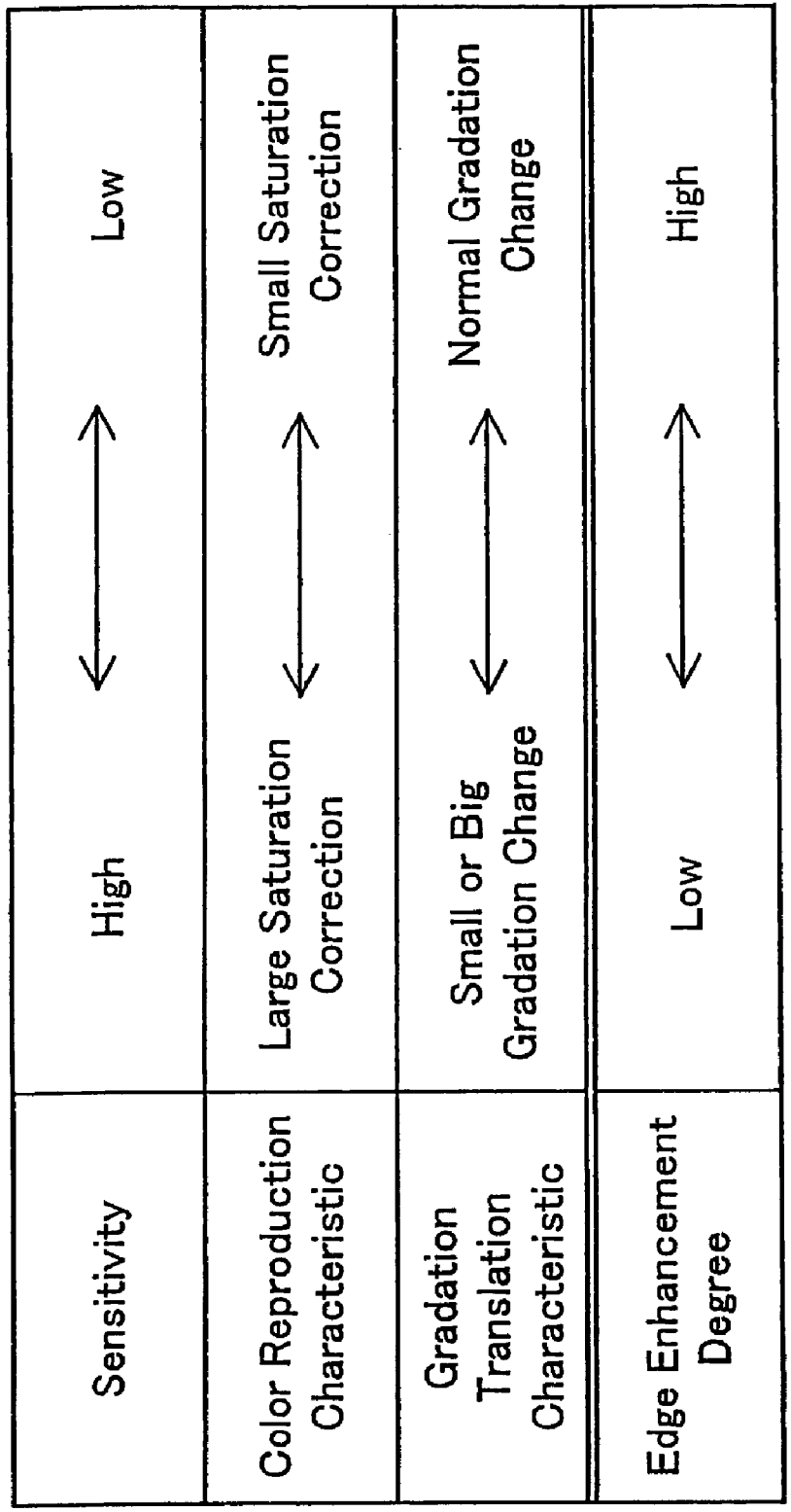
FIG. 3A is a table showing the relationship between photographic information and edge enhancement degree in the first embodiment.

In other words, each piece of the photographic information and the edge enhancement degree preferably have the relationship as shown in FIG. 3A.

In case of deciding the edge enhancement based on plural pieces of the photographic information as in this embodiment, it is preferable to give an appropriate weight to each piece of the photographic information in advance and determine the edge enhancement coefficient such that the photographic information having higher order of precedence is more strongly reflected in the edge enhancement coefficient.

An example of a lookup table (hereinafter referred to as LUT) which is created based on the concept explained above is shown in FIG. 3B.

It should be noted that FIG. 3B consists of three parts: the top part is an LUT used when sensitivity is ISO 200 to 399, the middle part is an LUT used when sensitivity is ISO 400 to 799, and the bottom part is an LUT used when sensitivity is ISO 800 to 1600. Since these parts have the same structure, the top LUT used when sensitivity is ISO 200 to 399 will be explained below.

Matrix numbers in a vertical axis indicate matrix numbers selected by the color matrix selecting section 21, in which a smaller number indicates a color matrix with a smaller saturation correction and a larger number indicates a color matrix with a larger saturation correction. Tone curve numbers in a horizontal axis indicate tone curve numbers selected by the tone curve selecting section 20, in which a smaller number indicates a tone curve more prominently reducing the change in gradation and a larger number indicates a tone curve more prominently increasing the change in gradation.

Further, numeric values in the LUT indicate the edge enhancement degree, in which a smaller numeric value indicates the lower edge enhancement degree and a larger numeric value indicates the higher edge enhancement degree. The LUT as shown in FIG. 3B is recorded in the edge enhancement coefficient determining section 22 in advance, and the edge enhancement coefficient determining section 22 determines the edge enhancement degree using such an LUT and determines an edge enhancement coefficient for realizing the determined edge enhancement degree. Then, the edge enhancement coefficient determining section 22 supplies the determined edge enhancement coefficient to the edge enhancement processing section 16.

As explained above, according to the first embodiment, the edge enhancement coefficient based on the sensitivity, the tone curve number, and the matrix number is determined using the LUT, and edge enhancement processing is performed using the determined edge enhancement coefficient. Thus, it is possible to perform edge enhancement processing according to the sensitivity, the gradation translation characteristic, and the color reproduction characteristic. Therefore, it is possible to perform appropriate edge enhancement processing and prevent noise and chromatic aberration from increasing, irrespective of values of the sensitivity at which an image is captured and of the gradation translation characteristic and the color reproduction characteristic of the image.

In particular, even when noise is amplified due to the sensitivity and the gradation translation characteristic, the noise can be prevented from amplifying by lowering the edge enhancement degree.

Further, even when chromatic aberration is amplified due to the color reproduction characteristic, the chromatic aberration can be prevented from worsening by lowering the edge enhancement degree.

Explanation of Second Embodiment

Hereinafter, a second embodiment of the present invention will be explained with reference to the drawings. It should be noted that only parts different from the first embodiment will be explained in the second embodiment.

The second embodiment is an example when the photographic information is exposure time, a lens characteristic, and a color reproduction characteristic.

Figure 4:
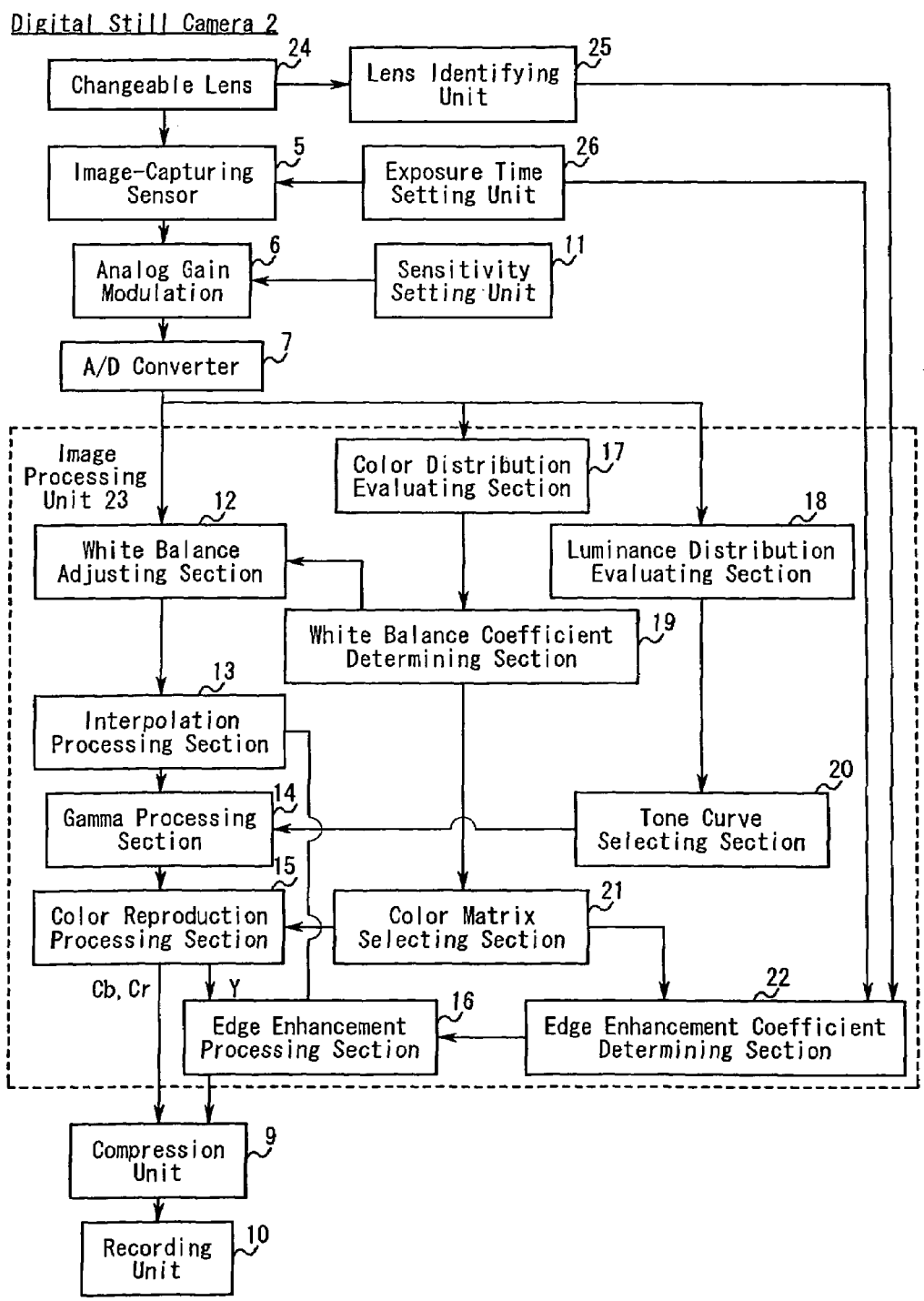
FIG. 4 is a diagram showing the schematic structure of a digital still camera of a second embodiment and function blocks of an image processing unit in the digital still camera.

FIG. 4 is a diagram showing the schematic structure of a digital still camera in the second embodiment and function blocks of an image processing unit in the digital still camera.

In FIG. 4, a digital still camera 2 has an image processing unit 23 in place of the image processing unit 8 of the digital still camera 1 in the first embodiment, a detachable changeable lens 24, a lens identifying unit 25 for obtaining a lens characteristic of the changeable lens 24 and an exposure time setting unit 26 for setting exposure time. Note that the lens identifying unit 25 and the exposure time setting unit 26 are the same as those included in an existing digital still camera. Since other components are the same as those in the first embodiment, they are assigned the same numerals as those in FIG. 1.

Further, as in the first embodiment, a program for executing operation procedures of each unit is recorded in advance in the digital still camera 2.

In the second embodiment, the way of executing image processing in the image processing unit 23 and the way of determining a coefficient to be used for each image processing except edge enhancement processing are the same as those in the first embodiment. Therefore, only the way of determining an edge enhancement coefficient will be explained below.

It should be noted that, in the second embodiment, the exposure time and the lens characteristic are used as the photographic information in place of the sensitivity and the gradation translation characteristic which are used as the photographic information in the first embodiment, and therefore an output of the exposure time setting unit 26 and an output of the lens identifying unit 25 are connected to the image processing unit 23.

<Determining Edge Enhancement Coefficient>

The edge enhancement coefficient to be used for edge enhancement processing is determined in the edge enhancement coefficient determining section 22 based on the exposure time, the lens characteristic, and a matrix number.

The second embodiment will describe an example in which lens resolution is used out of lens characteristics obtained by the lens identifying unit 25 which communicates with a not-shown CPU provided in the changeable lens 24. The lens resolution is represented by MTF (Modulation Transfer Function). In the second embodiment, MTF in a case of 10 spatial frequencies/mm is used as an index of the lens resolution.

The edge enhancement coefficient determining section 22 first determines edge enhancement degree.

Here, the relationship between each piece of the photographic information (the exposure time, the lens characteristic, and the color reproduction characteristic) and the edge enhancement degree will be explained.

The exposure time is set by the exposure time setting unit 26 according to photometry information from the not-shown photometry unit or set by the user and, when the exposure time is long, more noise is included in the image data supplied from the image-capturing sensor 5 as compared with a case of normal exposure time. Accordingly, by determining the edge enhancement degree to be low, noise can be prevented from amplifying. When the exposure time is short, less noise is included in the image data supplied from the image-capturing sensor 5 as compared with the case of normal exposure time. Accordingly, by determining the edge enhancement degree to be high, the image of higher sharpness can be obtained.

Further, when the lens resolution is high, sharpness of the image obtained by the image-capturing sensor 5 is higher than when the lens resolution is normal, and therefore the edge of the image does not need to be enhanced much. Accordingly, the edge enhancement degree is determined to be low. When the lens resolution is low, the sharpness of the image obtained by the image-capturing sensor 5 is lower than when lens resolution is normal, and therefore the edge of the image has to be highly enhanced. Accordingly, by determining the edge enhancement degree to be high, the image of higher sharpness can be obtained.

Note that the relationship between the color reproduction characteristic and the edge enhancement degree is the same as that in the first embodiment. In other words, each piece of the photographic information and the edge enhancement degree preferably have the relationship as shown in FIG. 5A.

In case of determining the edge enhancement coefficient based on plural pieces of the photographic information as in this embodiment, it is also preferable to give an appropriate weight to each piece of the photographic information in advance and determine the edge enhancement coefficient such that the photographic information having higher order of precedence is more strongly reflected in the edge enhancement coefficient, as in the first embodiment.

An example of an LUT which is created based on the concept explained above is shown in FIG. 5B.

It should be noted that FIG. 5B consists of three parts: the top part is an LUT used when lens resolution is MTF 70 to 100(%), the middle part is an LUT used when lens resolution is MTF 50 to 69(%), and the bottom part is an LUT used when lens resolution is MTF 0 to 49(%). Since these parts have the same structure, the top LUT used when lens resolution is MTF 70 to 100(%) will be explained below.

Similarly to the first embodiment, matrix numbers in a vertical axis indicate matrix numbers selected by the color matrix selecting section 21, in which a smaller number indicates a color matrix with a smaller saturation correction and a larger number indicates a color matrix with a larger saturation correction. Exposure time in a horizontal axis indicates exposure time set by the exposure time setting unit 26 (unit: seconds).

Further, numeric values in the LUT indicate the edge enhancement degree, in which a smaller numeric value indicates the lower edge enhancement degree and a larger numeric value indicates the higher edge enhancement degree. The LUT as shown in FIG. 5B is recorded in the edge enhancement coefficient determining section 22 in advance, and the edge enhancement coefficient determining section 22 determines the edge enhancement degree using such an LUT and determines an edge enhancement coefficient for realizing the determined edge enhancement degree. Then, the edge enhancement coefficient determining section 22 supplies the determined edge enhancement coefficient to the edge enhancement processing section 16.

As explained above, according to the second embodiment, the edge enhancement coefficient based on the exposure time, the lens resolution, and the matrix number is determined using the LUT and edge enhancement processing is performed using the determined edge enhancement coefficient. Thus, it is possible to perform edge enhancement processing according to the exposure time, the lens characteristic, and the color reproduction characteristic. Therefore, appropriate edge enhancement processing can be performed with increases in noise and chromatic aberration prevented, irrespective of values of the set exposure time at the time of capturing an image, of the characteristic of the lens used in capturing the image, and of the color reproduction characteristic of the image.

In particular, even when noise is amplified due to the exposure time, the noise can be prevented from increasing by lowering the edge enhancement degree.

Further, edge enhancement processing can be performed with a proper degree with noise increases prevented according to the lens resolution.

Furthermore, even when chromatic aberration is amplified due to the color reproduction characteristic, the chromatic aberration can be prevented from worsening by lowering the edge enhancement degree, as in the first embodiment.

Although the second embodiment describes the example of using the lens resolution as the lens characteristic, chromatic aberration of the lens, focus length, and the like may also be used as the lens characteristic. For example, in deciding the edge enhancement degree according to the color aberration of the lens, the smaller color aberration the lens has, the lower degree of edge enhancement is determined, and the larger color aberration the lens has, the higher degree of edge enhancement is determined. When an image is captured with a lens having a small color aberration, the image has small color aberration, and therefore a high degree of edge enhancement is determined to obtain the image of higher sharpness. On the other hand, when an image is captured with a lens having a larger color aberration, the image has a large color aberration; therefore, a low degree of edge enhancement is determined to prevent increases in color aberration.

Explanation of Third Embodiment

Hereinafter, a third embodiment of the present invention will be explained with reference to the drawings. It should be noted that, as in the second embodiment, only parts different from the first embodiment will be explained in the third embodiment.

The third embodiment is an example when the photographic information is information indicating the presence or absence of light emission of a flash device and the gradation translation characteristic.

Figure 6:
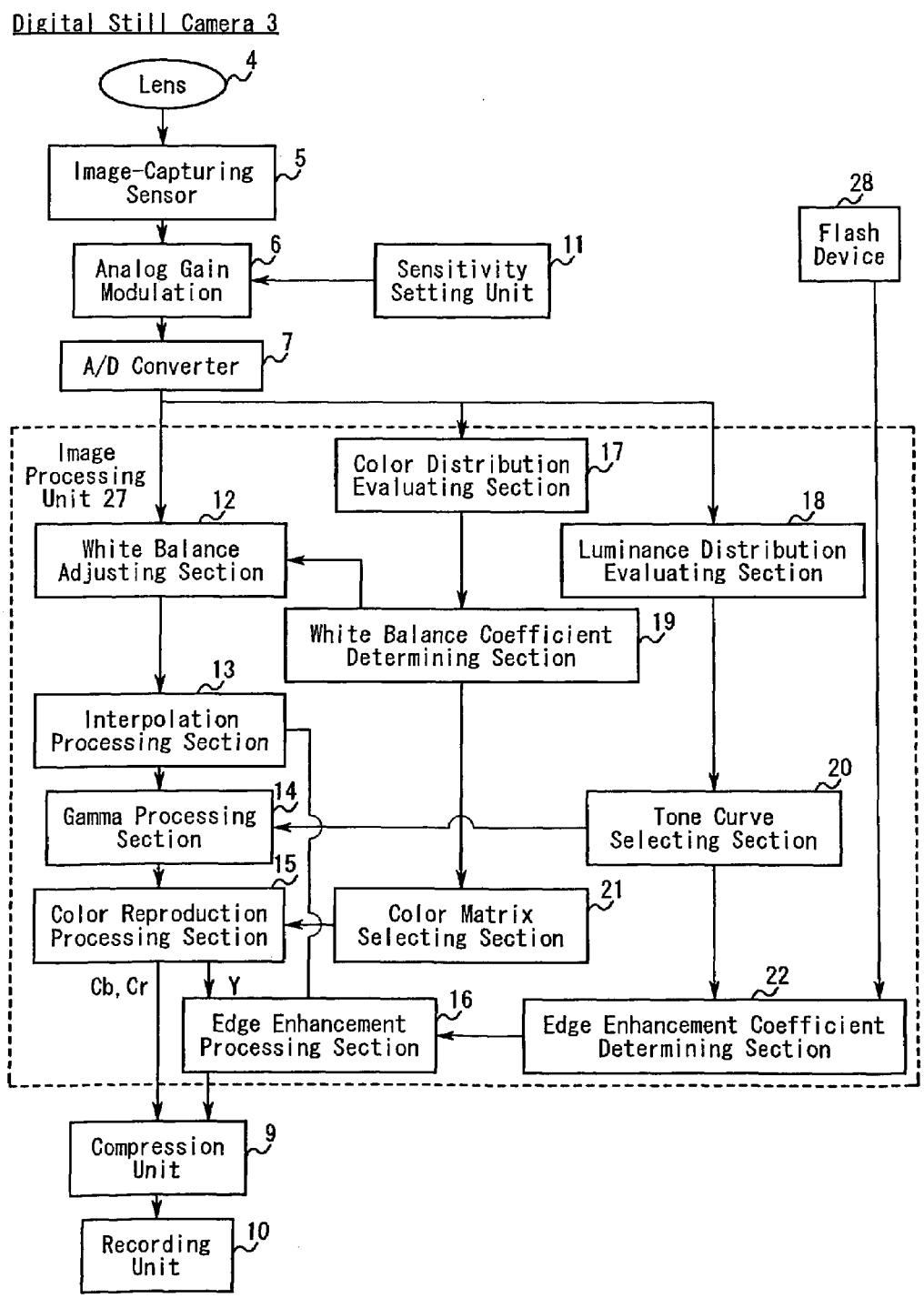
FIG. 6 is a diagram showing the schematic structure of a digital still camera of a third embodiment and function blocks of an image processing unit in the digital still camera.

FIG. 6 is a diagram showing the schematic structure of a digital still camera in the third embodiment and function blocks of an image processing unit in the digital still camera.

In FIG. 6, a digital still camera 3 has an image processing unit 27 in place of the image processing unit 8 of the digital still camera 1 in the first embodiment, and a flash device 28. Incidentally, the flash device 28 is the same as an existing flash device. Since other components are similar to those in the first embodiment, they are assigned the same numerals as those in FIG. 1.

Further, as in the first embodiment and the second embodiment, a program for executing operation procedures of each unit is recorded in advance in the digital still camera 3.

In the third embodiment, the way of performing image processing in the image processing unit 27 and the way of determining a coefficient to be used for each image processing except edge enhancement processing are the same as those in the first embodiment. Therefore, only the way of determining an edge enhancement coefficient will be explained below.

It should be noted that, in the third embodiment, information indicating the presence or absence of light emission of the flash device 28 is used as the photographic information in place of the sensitivity and the gradation translation characteristic which are used as the photographic information in the first embodiment. Therefore, the information indicating the presence or absence of light emission of the flash device 28 in capturing an image (information on the state of a flash device) is supplied to the image processing unit 27.

<Determining Edge Enhancement Coefficient>

The edge enhancement coefficient to be used for edge enhancement processing is determined in the edge enhancement coefficient determining section 22 based on the information indicating the presence or absence of light emission of the flash device 28 and the tone curve number.

The edge enhancement coefficient determining section 22 first determines the edge enhancement degree.

Here, the relationship between each piece of the photographic information (the information indicating the presence or absence of light emission of the flash device, and the gradation translation characteristic) and the edge enhancement degree will be explained.

When light is emitted from the flash device 28, more noise is included in the image data supplied from the image-capturing sensor 5 as compared with a case in which light is not emitted from the flash device 28. Accordingly, by determining the edge enhancement degree to be low, noise can be prevented from increasing.

Note that the relationship between the gradation translation characteristic and the edge enhancement degree is the same as that in the first embodiment In other words, each piece of the photographic information and the edge enhancement degree preferably have the relationship as shown in FIG. 7A.

In case of determining the edge enhancement coefficient based on plural pieces of the photographic information as in this embodiment, it is also preferable to give an appropriate weight to each piece of the photographic information in advance and determine the edge enhancement coefficient such that the photographic information having higher order of precedence is more strongly reflected in the edge enhancement coefficient, as in the first embodiment and the second embodiment.

An example of an LUT which is created based on the concept explained above is shown in FIG. 7B.

A vertical axis in FIG. 7B indicates the presence and absence of light emission of the flash device 28. The tone curve numbers in a horizontal axis indicate tone curve numbers selected by the tone curve selecting section 20, in which the smaller the number, the smaller change in gradation, and the larger the number, the larger change in gradation.

Further, numeric values in the LUT indicate the edge enhancement degree, in which a smaller numeric value indicates the lower edge enhancement degree and a larger numeric value indicates the higher edge enhancement degree. The LUT as shown in FIG. 7B is recorded in the edge enhancement coefficient determining section 22 in advance, and the edge enhancement coefficient determining section 22 determines the edge enhancement degree using such an LUT and determines an edge enhancement coefficient for realizing the determined edge enhancement degree. Then, the edge enhancement coefficient determining section 22 supplies the determined edge enhancement coefficient to the edge enhancement processing section 16.

As explained above, according to the third embodiment, the edge enhancement coefficient based on the information indicating the presence or absence of light emission of the flash device and the tone curve number is determined using the LUT, and edge enhancement processing is performed using the determined edge enhancement coefficient. Thus, it is possible to perform edge enhancement processing depending on the presence or absence of light emission of the flash device and the gradation translation characteristic. Therefore, appropriate edge enhancement processing can be performed with increases in noise and chromatic aberration prevented, irrespective of the presence or absence of light emission of the flash device when an image is captured and irrespective of a value of the gradation translation characteristic of the image.

In particular, even when noise is amplified due to the light emission of the flash device and the gradation translation characteristic, the noise can be prevented from amplifying by lowering the edge enhancement degree.

Note that the enhancement degree set by the user may be taken into consideration in determining the edge enhancement coefficient in each of the first embodiment to the third embodiment. Specifically, it is suitable that plural LUTs which are associated with the user-set enhancement degree are recorded in advance in the edge enhancement coefficient determining section to appropriately use each of the LUTs depending on the set enhancement degree. This allows the present invention to be applied to an image processing apparatus (or an image processing unit of a digital still camera, and the like) which performs edge enhancement processing, using an edge enhancement coefficient according to the enhancement degree set by a user.

Further, although each of the first embodiment to the third embodiment describes the example of determining the edge enhancement coefficient using the LUT, it is also suitable that an appropriate arithmetic equation is recorded in the edge enhancement coefficient determining section in advance to determine the edge enhancement coefficient by using the arithmetic equation.

Furthermore, the first embodiment to the third embodiment describes the example of selecting the tone curve number by the tone curve selecting section based on luminance distribution in the image, but the present invention is not limited thereto. For example, the tone curve may be selected in association with the gradation translation characteristic selected by the user's operation. In this case, the tone curve selecting section selects the tone curve number based on the gradation translation characteristic selected by the user's operation, and the edge enhancement coefficient determining section determines the edge enhancement coefficient based on the tone curve number selected by the tone curve selecting section.

Moreover, the operations which the image processing unit performs in the first embodiment to the third embodiment may be executed with a computer. In this case, a program for executing the flow chart shown in FIG. 2 is to be installed in the computer.

Explanation of Fourth Embodiment

Hereinafter, a fourth embodiment of the present invention will be explained with reference to the drawings.

The fourth embodiment is an example when the photographic information is a light source characteristic obtained from a divisional photometry sensor which will be described later.

Figure 8:
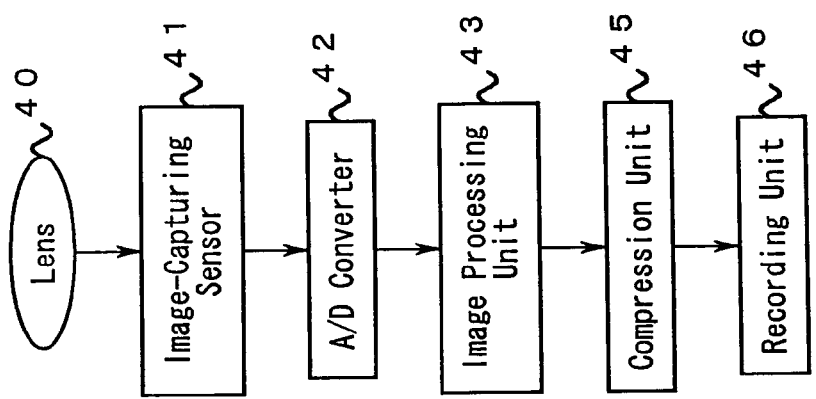
FIG. 8 is a diagram showing the schematic structure of a digital still camera of a fourth embodiment.

FIG. 8 is a diagram showing the schematic structure of a digital still camera in the fourth embodiment.

In FIG. 8, a digital still camera 31 has a lens 40, an image-capturing sensor 41, an A/D converter 42, an image processing unit 43, a compression unit 45, a recording unit 46, and a not-shown divisional photometry sensor.

Image data obtained by the image-capturing sensor 41 is converted to a digital signal in the A/D converter 42, and subjected to image processing in the image processing unit 43 based on information obtained by the divisional photometry sensor (the light source characteristic, contrast of the image, and the like). Then, when the image processing is completed, the data is outputted to the compression unit 45 and the recording unit 46.

Here, the image processing performed in the fourth embodiment is white balance adjustment, interpolation and smoothing processing, color correction processing, gamma processing, and edge enhancement processing. Photometry information outputted by the divisional photometry sensor is supplied to a color temperature determining section 47 and a contrast determining section 48, which will be described later, in the image processing unit 43. Such a divisional photometry sensor may be an ambient sensor or may be a-through-the-lens sensor which branches off a part of an optical flux incident from the lens 40 and captures it.

The digital still camera 31 has a program for executing operation procedures of each unit recorded therein in advance. The program may be recorded on a medium or may be downloaded via the Internet as a transmission wave.

Figure 9:
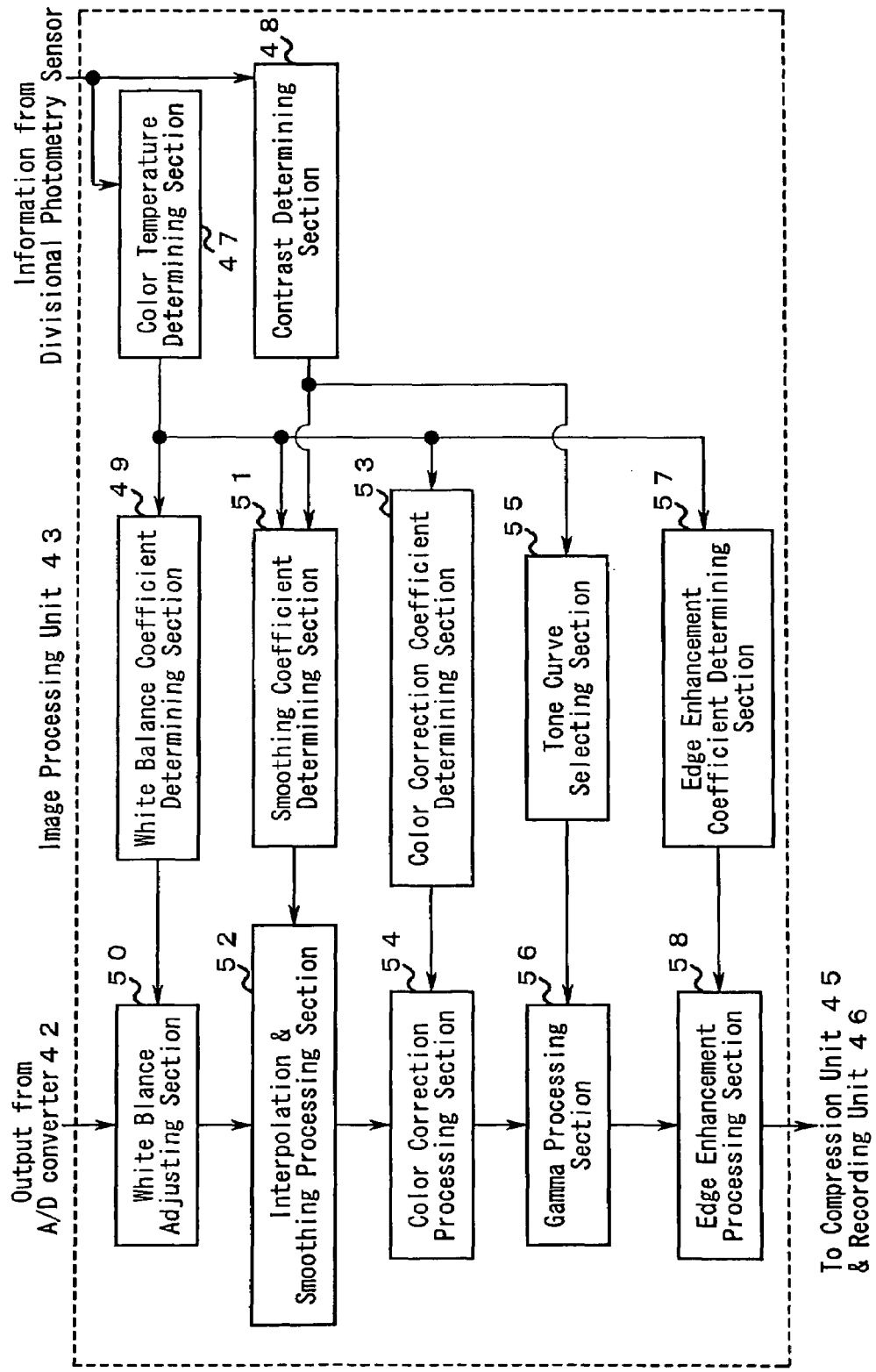
FIG. 9 is a diagram showing function blocks of an image processing unit in the digital still camera of the fourth embodiment.

FIG. 9 is a diagram of function blocks of the image processing unit 43 in the digital still camera 31 of the fourth embodiment.

In FIG. 9, a white balance adjusting section 50, an interpolation and smoothing processing section 52, a color correction processing section 54, a gamma processing section 56, and an edge enhancement processing section 58 are provided in the image processing unit 43. Further, in order to determine a coefficient (including a tone curve) to be used for image processing in each of these sections, the color temperature determining section 47, the contrast determining section 48, a white balance coefficient determining section 49, a smoothing coefficient determining section 51, a color correction coefficient determining section 53, a tone curve selecting section 55, and an edge enhancement coefficient determining section 57 are provided in the image processing unit 43.

Hereinafter, the operation of the image processing unit 43 will be explained with reference to FIG. 9 and a flow chart in FIG. 10.

Figure 10:
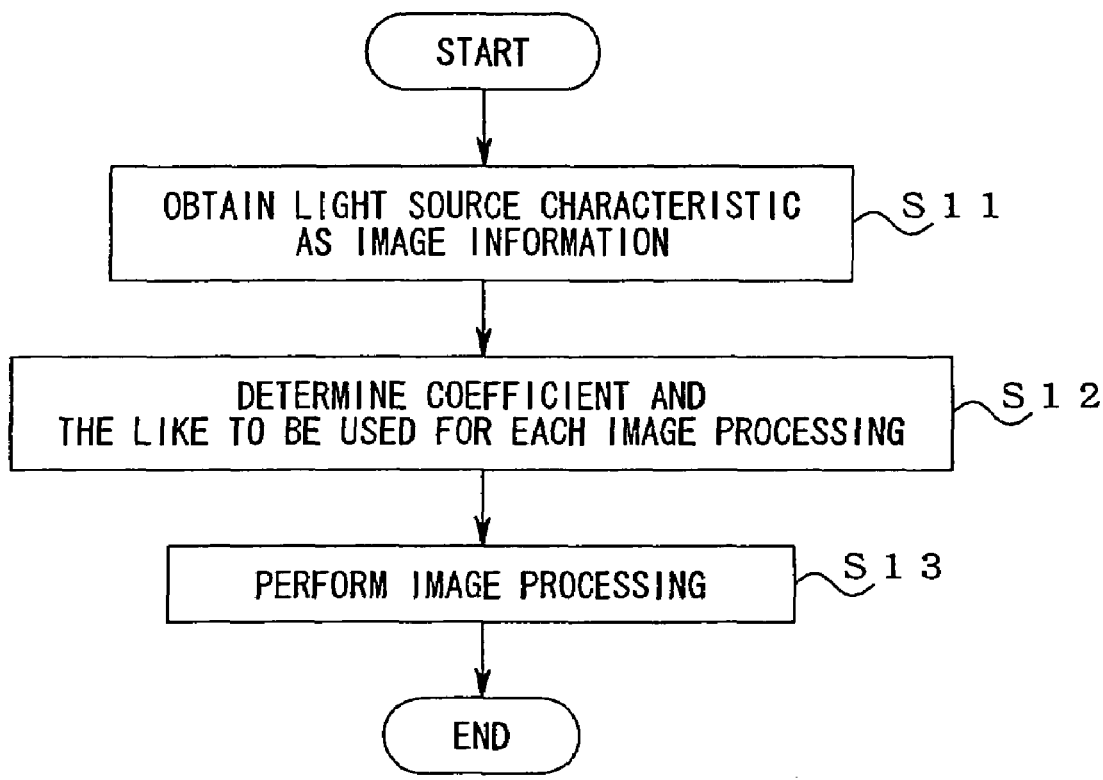
FIG. 10 is a flow chart showing the operation of the image processing unit in the digital still camera of the fourth embodiment.

As shown in FIG. 10, the image processing unit 43 first obtains the light source characteristic as photographic information (step S11), and determines a coefficient and the like to be used for each image processing based on the obtained light source characteristic (step S12). Then, using the coefficients and the like determined in step S12, the image processing unit 43 performs image processing to an image (step S13). Here, the characteristics of the present invention lie in determining the coefficients to be used for image processing in the image processing unit 43 (step S11 and step S12 in FIG. 10), and the way of performing image processing (step S13 in FIG. 10) is the same as the known art. Therefore, how image processing is performed will be first explained briefly, and then the way of determining the coefficient to be used for each image processing will be explained in detail.

In the image processing unit 43, the white balance adjusting section 50 makes white balance adjustment to image data inputted from the A/D converter 42, using a white balance coefficient which the white balance coefficient determining section 49 determines according to a method which will be described later. The interpolation and smoothing processing section 52 divides the white-balance adjusted image data into edges and a smooth portion to perform interpolation processing, and further performs smoothing processing on the interpolated image data, using a smoothing coefficient which the smoothing coefficient determining section 51 determines according to a method which will be described later.

Next, the color correction processing section 54 performs color correction processing, using a color correction coefficient which the color correction coefficient determining section 53 determines according to a method which will be described later.

Then, the gamma processing section 56 performs gamma processing on image data, using a tone curve which the tone curve selecting section 55 selects according to a method which will be described later from plural tone curves previously recorded in the gamma processing section 56.

Subsequently, the edge enhancement processing section 58 performs edge enhancement processing on the gamma-processed image data, using an edge enhancement coefficient which the edge enhancement coefficient determining section 57 determines according to a method which will be described later.

Hereinafter, methods of obtaining the photographic information and of determining the coefficients to be used for image processing will be explained in detail.

<Determining White Balance Coefficient>

The white balance coefficient to be used for white balance adjustment is determined by the white balance coefficient determining section 49 based on color temperature. The color temperature is determined by the color temperature determining section 47 based on information obtained by the divisional photometry sensor. The white balance coefficient determining section 49 supplies the determined white balance coefficient to the white balance adjusting section 50.

<Determining Coefficient to be Used for Interpolation>

A coefficient to be used for interpolation is predetermined based on a characteristic of the image-capturing sensor 41.

<Determining Smoothing Coefficient>

The smoothing coefficient to be used for smoothing processing is determined in the smoothing coefficient determining section 51 based on the color temperature determined by the color temperature determining section 47 and a value representing a contrast amount of a subject (hereinafter referred to "contrast data") which is determined by the contrast determining section 48 on the basis of the information obtained by the divisional photometry sensor. Note that the contrast determining section 48 determines a value to be the contrast data by dividing the information obtained by the divisional photometry sensor into small regions and multiplying luminance difference between highlight and shadow by a fixed normalization coefficient. In the fourth embodiment, the contrast data is represented as 1 to 7, which indicates the larger contrast data, the higher contrast, that is, luminance difference between highlight and shadow of field is large.

The smoothing coefficient determining section 51 determines the smoothing coefficient based on the color temperature and the contrast data. Specifically, it first determines smoothing degree using an LUT as shown in FIG. 11.

FIG. 11 is an example of an LUT used for determining the smoothing degree.

A horizontal axis in FIG. 11 indicates color temperatures while a vertical axis indicates the contrast data, in which smaller contrast data indicates lower contrast of a subject and larger contrast data indicates higher contrast of the subject. Numeric values in the LUT indicate the smoothing degree, in which a smaller numeric value indicates lower smoothing degree and a larger numeric value indicates higher smoothing degree. The smoothing coefficient determining section 51 determines the smoothing degree based on the color temperature and the contrast data using such an LUT, and determines a smoothing coefficient for realizing the determined smoothing degree. Then, the smoothing coefficient determining section 51 supplies the determined smoothing coefficient to the interpolation and smoothing processing section 52.

It should be noted that the LUT shown in FIG. 11 is assumed to be created in advance based on the following concept, and recorded in the smoothing coefficient determining section 51.

Figure 12:
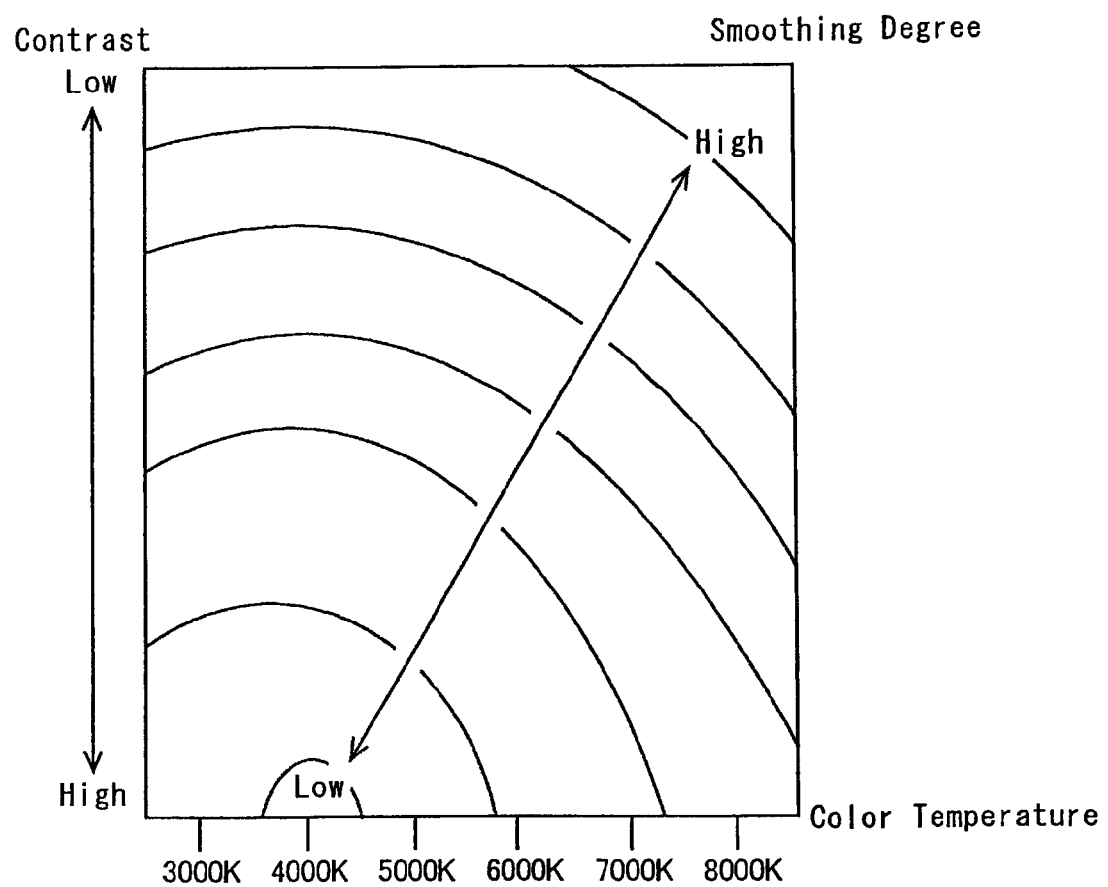
FIG. 12 is a conceptual chart for explaining the LUT.

FIG. 12 is a conceptual chart for explaining the LUT shown in FIG. 11.

As shown in FIG. 12, the smoothing degree has its center at color temperature of 4000 K (color temperature of sunlight, and color temperature as the reference for white balance), and it is set to be lower as closer to the center while it is set to be higher as farther from the center. Further, the smoothing degree is set to be lower as the contrast of the subject is higher while it is set to be higher as the contrast of the subject is lower.

Accordingly, when the color temperature is far from 4000 K and noise is amplified due to the white balance adjustment, the noise can be reduced by increasing the smoothing degree.

<Determining Color Correction Coefficient>

A color correction coefficient to be used for color correction processing is determined by the color correction coefficient determining section 53 based on the color temperature determined by the color temperature determining section 47. The color correction coefficient determining section 53 determines the color correction coefficient by the same method as that disclosed in the specification of U.S. Pat. No. 5,805,213, and supplies the determined color correction coefficient to the color correction processing section 54.

<Determining Tone Curve>

A tone curve to be used for gamma processing is selected by the tone curve selecting section 55. The tone curve selecting section 55 determines a tone curve to be used out of plural tone curves previously recorded in the gamma processing section 56, based on contrast information including the contrast data determined by the contrast determining section 48, by the same method as that disclosed in Japanese Unexamined Patent Application Publication No. 2001-54014, and supplies the determined tone curve to the gamma processing section 56.

<Determining Edge Enhancement Coefficient>

An edge enhancement coefficient to be used for edge enhancement processing is determined in the edge enhancement coefficient determining section 57 based on the color temperature and the contrast data, similarly to the smoothing coefficient.

The edge enhancement coefficient determining section 57 determines the edge enhancement coefficient based on the color temperature and the contrast data. Specifically, it first determines edge enhancement degree using an LUT as shown in FIG. 13.

FIG. 13 is an example of an LUT used in determining the edge enhancement degree.

A horizontal axis in FIG. 13 indicates color temperatures and a vertical axis indicates contrast data, in which smaller contrast data indicates lower contrast of a subject and larger contrast data indicates higher contrast of the subject. Numeric values in the LUT indicate the edge enhancement degree, in which a smaller numeric value indicates lower edge enhancement degree and a larger numeric value indicates higher edge enhancement degree. The edge enhancement coefficient determining section 57 determines the edge enhancement degree based on the color temperature and the contrast data using such an LUT, and determines an edge enhancement coefficient for realizing the determined edge enhancement degree. Then, the edge enhancement coefficient determining section 57 supplies the determined edge enhancement coefficient to the edge enhancement processing section 58.

It should be noted that the LUT shown in FIG. 13 is to be created in advance based on the following concept, and recorded in the edge enhancement coefficient determining section 57.

Figure 14:
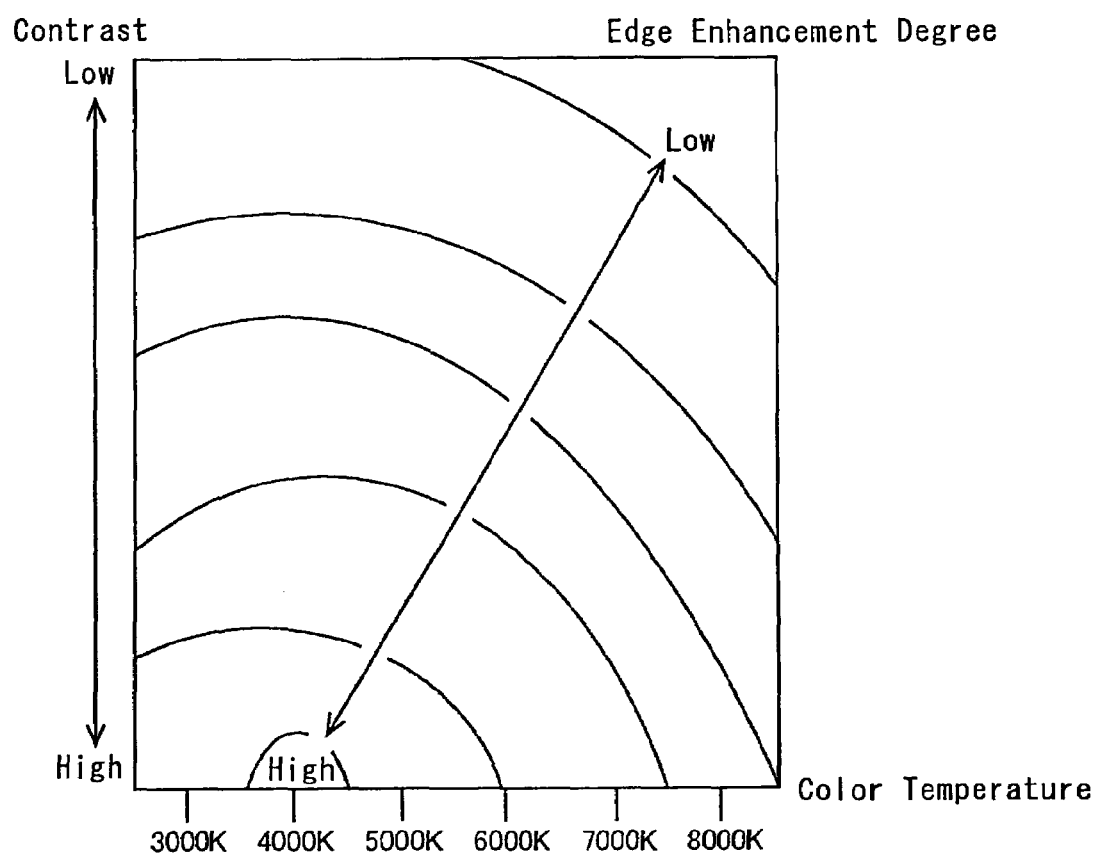
FIG. 14 is a conceptual chart for explaining the LUT.

FIG. 14 is a conceptual chart for explaining the LUT shown in FIG. 13.

As shown in FIG. 14, the enhancement degree has its center at color temperature of 4000 K (color temperature of sunlight, and color temperature as the reference for white balance) and it is set to be higher as closer to the center while it is set to be lower as farther away from the center. Further, the edge enhancement degree is set to be higher as the contrast of the subject is higher while it is set to be lower as the contrast of the subject is lower.

Accordingly, when noise is amplified due to white balance adjustment because the color temperature is far from 4000 K, the noise can be prevented from amplifying by determining the edge enhancement degree to be low. When noise is not amplified due to white balance adjustment because the color temperature is approximately 4000 K, the image of higher sharpness can be obtained by determining the edge enhancement degree to be high.

As explained above, according to the fourth embodiment, the coefficient to be used in performing each of white balance adjustment, interpolation and smoothing processing, color correction processing, gamma processing, and edge enhancement processing is determined based on the information obtained by the divisional photometry sensor so as to perform each image processing. Therefore, noise increases can be prevented in the process of the image processing.

In particular, even amplified noise due to the white balance adjustment can be reduced by increasing the smoothing degree or noise increases can be prevented by lowering the edge enhancement degree.

Explanation of Fifth Embodiment

Hereinafter, a fifth embodiment of the present invention will be explained with reference to the drawings. It should be noted that only parts different from the fourth embodiment will be explained in the fifth embodiment.

The fifth embodiment is an example when the photographic information is a light source characteristic obtained by a color temperature sensor which will be described later.

A digital still camera 32 of the fifth embodiment has an image processing unit 59 in place of the image processing unit 43 of the digital still camera 31 in the fourth embodiment, and has a not-shown color temperature sensor in place of the divisional photometry sensor. It should be noted that, since other components are the same as those in the fourth embodiment, explanation and illustration thereof will be omitted and the same numerals as in FIG. 8 are used for explanation below.

In the image processing unit 59 of the digital still camera 32, each image processing is performed based on information obtained by the color temperature sensor (such as the light source characteristic). Further, as in the digital still camera 31, a program for executing operation procedures of each unit is recorded in the digital still camera 32 in advance.

Figure 15:
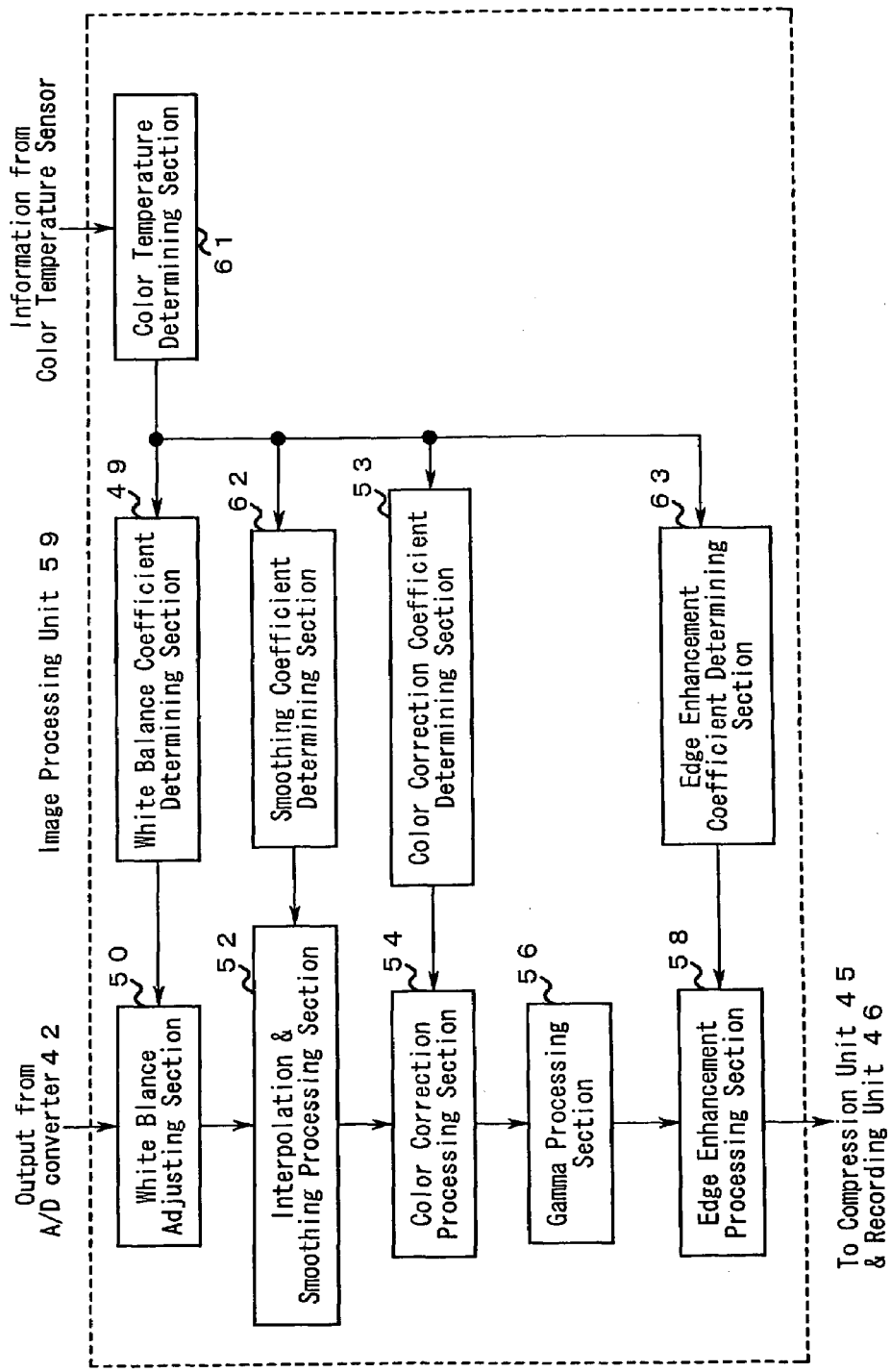
FIG. 15 is a diagram showing function blocks of an image processing unit in a digital still camera of a fifth embodiment.

FIG. 15 is a diagram of function blocks of the image processing unit 59 in the digital still camera 32 of the fifth embodiment.

In FIG. 15, the contrast determining section 48 and the tone curve selecting section 55 of the image processing unit 43 in the fourth embodiment are omitted, a color temperature determining section 61 is provided in place of the color temperature determining section 47, a smoothing coefficient determining section 62 is provided in place of the smoothing coefficient determining section 51, and an edge enhancement coefficient determining section 63 is provided in place of the edge enhancement coefficient determining section 57 in the image processing unit 59. Since other components are the same as those in the fourth embodiment, they are assigned the same numerals as those in the fourth embodiment.

Hereinafter, the operation of the image processing unit 59 will be explained. The way the image processing unit 59 performs image processing in is the same as the known art, and only determining the coefficient to be used for each image processing will be explained below, as in the fourth embodiment.

<Determining White Balance Coefficient>

A white balance coefficient to be used for white balance adjustment is determined based on color temperature, as in the fourth embodiment. The color temperature is determined by the color temperature determining section 61 based on information obtained by the color temperature sensor. The white balance coefficient determining section 49 supplies the determined white balance coefficient to the white balance adjusting section 50.

<Determining Coefficient to be Used for Interpolation>

A coefficient to be used for interpolation is predetermined based on a characteristic of the image-capturing sensor 41, as in the fourth embodiment.

<Determining Smoothing Coefficient>

A smoothing coefficient to be used for smoothing processing is determined by the smoothing coefficient determining section 62 based on the color temperature which is determined by the color temperature determining section 61 on the basis of the information obtained by the color temperature sensor.

The smoothing coefficient determining section 62 determines the smoothing coefficient using an LUT as shown in FIG. 16 which is recorded in the smoothing coefficient determining section 62 in advance, and supplies the determined smoothing coefficient to the interpolation and smoothing processing section 52.

In the LUT shown in FIG. 16, such a smoothing coefficient as has its center at color temperature of 4000 K is set, and the smoothing degree is lower as it becomes closer to the center while the smoothing degree is higher as it becomes farther away from the center.

Accordingly, when performing the white balance adjustment causes noise amplification because the color temperature is far from 4000 K, increasing the smoothing degree can reduce the noise.

<Determining Color Correction Coefficient>

A color correction coefficient to be used for color correction processing is determined by the color correction coefficient determining section 53, as in the fourth embodiment, based on the color temperature determined by the color temperature determining section 61.

<Determining Tone Curve>

As a tone curve to be used for gamma processing, one tone curve is predetermined in the gamma processing section 56.

<Determining Edge Enhancement Coefficient>

An edge enhancement coefficient to be used for edge enhancement processing is determined by the edge enhancement coefficient determining section 63 based on the color temperature which is determined in the color temperature determining section 61 on the basis of the information obtained by the color temperature sensor.

The edge enhancement coefficient determining section 63 determines the edge enhancement coefficient using an LUT as shown in FIG. 17 which is recorded in the edge enhancement coefficient determining section 63 in advance, and supplies the determined edge enhancement coefficient to the edge enhancement processing section 58.

In the LUT shown in FIG. 17, such an edge enhancement coefficient as has its center at color temperature of 4000 K is set, and the edge enhancement degree is higher as it becomes closer to the center while the edge enhancement degree is lower as it becomes farther away from the center.

Accordingly, when performing white balance adjustment causes noise amplification because the color temperature is far from 4000 K, the noise can be prevented from amplifying by setting the edge enhancement degree to be low. When the color temperature is approximately 4000 K so the white balance adjustment does not cause noise amplification, it is possible to obtain an image of higher sharpness by setting the edge enhancement degree to be high.

As explained above, according to the fifth embodiment, the coefficient to be used in performing each of white balance adjustment, smoothing processing, color correction processing, and edge enhancement processing is determined based on the information obtained by the color temperature sensor so as to perform image processing. Therefore, noise can be prevented from amplifying in the process of the image processing.

In particular, even amplified noise due to the white balance adjustment can be reduced by increasing the smoothing degree or noise increases can be prevented by lowering the edge enhancement degree.

Explanation of Sixth Embodiment

Hereinafter, a sixth embodiment of the present invention will be explained with reference to the drawings. It should be noted that, as in the fifth embodiment, only parts different from the fourth embodiment will be explained in the sixth embodiment.

The sixth embodiment is an example when the photographic information is a light source characteristic obtained by a light source selecting unit which will be described later.

A digital still camera 33 of the sixth embodiment has an image processing unit 64 in place of the image processing unit 43 of the digital still camera 31 in the fourth embodiment, and a not-shown light source selecting unit in place of the divisional photometry sensor. It should be noted that, since other components are the same as those in the fourth embodiment, explanation and illustration thereof will be omitted and the same numerals as those in FIG. 8 are used for explanation below.

Here, the light source selecting unit is an operating unit including buttons for selecting a light source such as sunlight, an electric bulb, a fluorescent lamp, cloudy weather, the flash device, and the like which is illuminating the subject, by a user's operation, a menu displayed on a monitor, and the like. In the image processing unit 64 of the digital still camera 33, image processing is performed based on information indicating a kind of the light source selected by the light source selecting unit.

Further, a program for executing operation procedures of each unit is recorded in advance in the digital still camera 33, as in the digital still camera 31.

Figure 18:
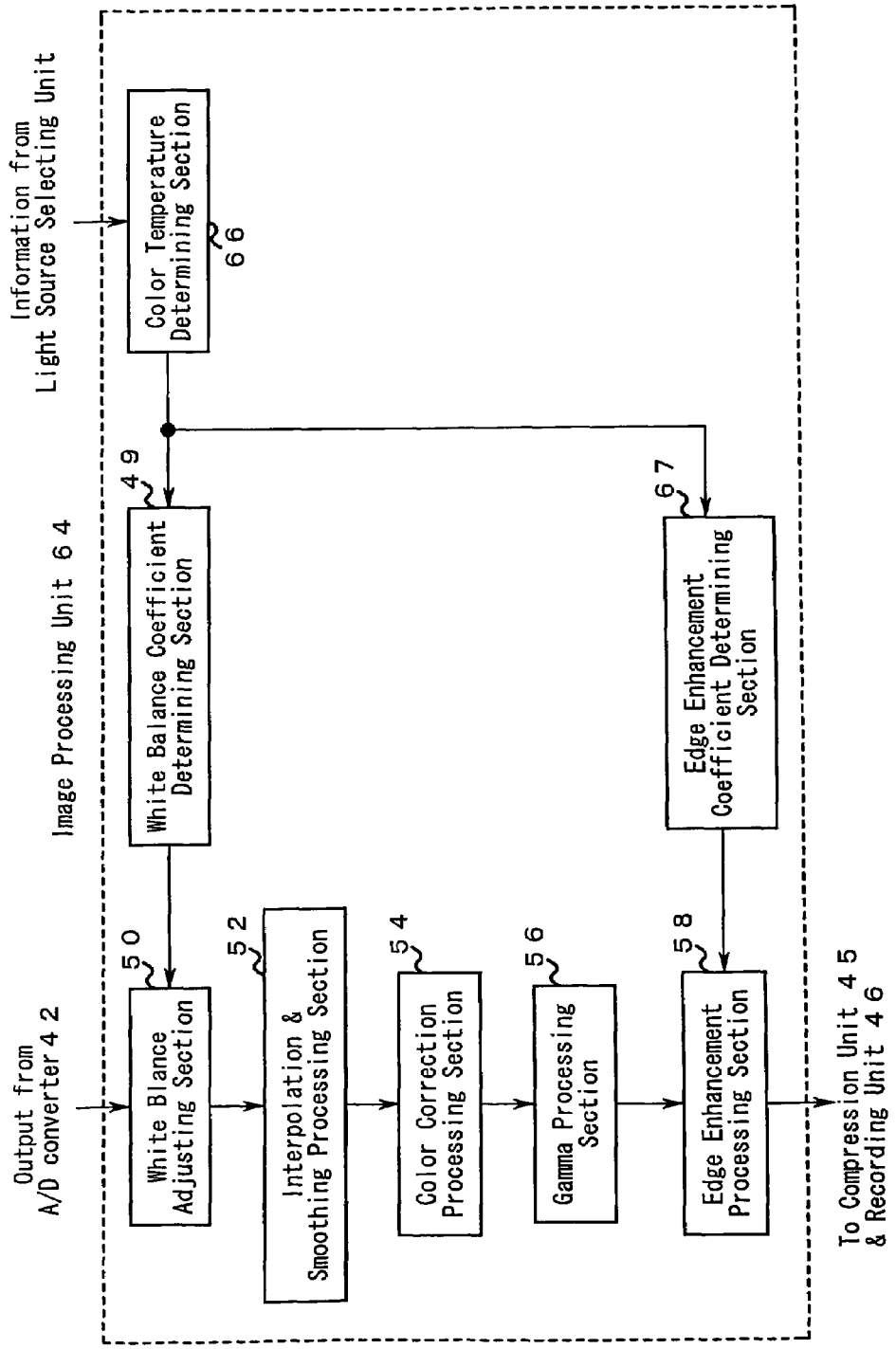
FIG. 18 is a diagram showing function blocks of an image processing unit in a digital still camera of a sixth embodiment.

FIG. 18 is a diagram of function blocks of the image processing unit 64 in the digital still camera 33 of the sixth embodiment.

In FIG. 18, the smoothing coefficient determining section 51, the color correction coefficient determining section 53, and the tone curve selecting section 55 of the image processing unit 43 in the fourth embodiment are omitted, a color temperature determining section 66 is provided in place of the color temperature determining section 47, and an edge enhancement coefficient determining section 67 is provided in place of the edge enhancement coefficient determining section 57, in the image processing unit 64. Since other components are the same as those in the fourth embodiment, they are assigned the same numerals as those in the fourth embodiment.

Hereinafter, the operation of the image processing unit 64 will be explained. The way the image processing unit 64 performs the image processing is the same as the known art, and only determining the coefficient to be used for each image processing will be explained below, as in the fourth embodiment and the fifth embodiment.

<Determining White Balance Coefficient>

A white balance coefficient to be used for white balance adjustment is determined based on color temperature, as in the fourth embodiment. The color temperature is determined by the color temperature determining section 66 based on the light source selected by the light source selecting unit. The white balance coefficient determining section 49 supplies the determined white balance coefficient to the white balance adjusting section 50.

<Determining Coefficient to be Used for Interpolation>

A coefficient to be used for interpolation is predetermined based on a characteristic of the image-capturing sensor 41, as in the fourth embodiment and the fifth embodiment.

<Determining Smoothing Coefficient>

A smoothing coefficient to be used for smoothing processing is predetermined in the interpolation and smoothing processing section 52.

<Determining Color Correction Coefficient>

A color correction coefficient to be used for color correction processing is predetermined in the color correction processing section 54.

<Determining Tone Curve>

As a tone curve to be used for gamma processing, one tone curve is predetermined in the gamma processing section 56, as in the fifth embodiment.

<Determining Edge Enhancement Coefficient>

An edge enhancement coefficient to be used for edge enhancement processing is determined by the edge enhancement coefficient determining section based on the color temperature determined in the color temperature determining section 66.

As in the fifth embodiment, the edge enhancement coefficient determining section 67 determines the edge enhancement coefficient using the same LUT as that shown in FIG. 17, which is recorded in the edge enhancement coefficient determining section 67 in advance, based on the color temperature, and supplies the determined edge enhancement coefficient to the edge enhancement processing section 58.

By determining the edge enhancement degree in such a manner, the same effect as that in the fifth embodiment is obtained.

As explained above, in the sixth embodiment, the edge enhancement coefficient is determined based on the information obtained by the light source selecting unit so as to perform edge enhancement processing. Therefore, noise can be prevented from amplifying in the process of the image processing.

In particular, when noise is amplified due to the white balance adjustment, lowering the edge enhancement degree can prevent an increase in the noise.

It should be noted that, the sixth embodiment describes the example of predetermining the smoothing coefficient and the color correction coefficient; however, the present invention is not limited thereto. Either or both of the coefficients may be determined, by the method explained in the fifth embodiment, based on the color temperature determined by the color temperature determining section 66. In this case, it is suitable that a smoothing coefficient determining section and a color correction coefficient determining section are newly provided and the same LUT as that shown in FIG. 16 is recorded in advance in the smoothing coefficient determining section.

In addition, the fourth embodiment to the sixth embodiment describe the example of determining coefficients to be used for each image processing based on the information which is obtained with the divisional photometry sensor, the color temperature sensor, the light source selecting unit, however, the coefficients may be determined in accordance with information obtained from the image data which is obtained by the image-capturing sensor.

Further, the fourth embodiment to the sixth embodiment describes the example of preferentially performing white balance adjustment to perform other image processings with the resulting noise amplification taken into consideration, but another image processing may be preferentially performed.

By way of example, the edge enhancement processing may be executed first to modify white balance adjustment operations upon noise amplification resulting from the edge enhancement processing being considered. Which of image processings will be performed first may be predetermined or may be selectable by a user's operation.

Furthermore, the fourth embodiment to the sixth embodiment describe the example of determining the coefficients to be used for each image processing based on the color temperature and the contrast, but the coefficients may be determined based on ISO speed as well as the color temperature and the contrast.

Moreover, the fourth embodiment to the sixth embodiment describes the example of automatically determining the color temperature and the contrast data in the color temperature determining section and the contrast determining section, respectively, however, the color temperature, the contrast data, and the ISO speed may be settable by the user.

In addition, a computer may perform the operations which the image processing unit performs in the fourth embodiment to the sixth embodiment. In this case, the computer is to have a program for executing the flow chart shown in FIG. 10 installed therein.

Further, the above embodiments describe the examples by using the digital still camera, but the present invention can be applied to any device, only if the device is capable of performing at least edge enhancement processing on an image, such as an image processing system composed of a personal computer, a display, and the like. In such a case, however, a personal computer has to have a pre-installed image processing program for executing image processing or is to be recorded on a medium or downloaded from the Internet as in the image processing unit of the digital still camera in any of the above-described embodiments.

Furthermore, any combination of the photographic information used in each of the aforesaid embodiments is possible.

The invention is not limited to the above embodiments and various modifications may be made without departing from the spirit and scope of the invention. Any improvement may be made in part or all of the components.

What is claimed is:

1. An image processing apparatus performing at least a white balance adjustment and an edge enhancement processing to an image being inputted, comprising:
   a light source characteristic obtaining part obtaining a light source characteristic which appears at the time the image to be processed is captured;
   a coefficient determining part determining a white balance coefficient used for performing the white balance adjustment and an edge enhancement coefficient used for performing the edge enhancement processing according to color temperature information calculated from the light source characteristic obtained by the light source characteristic obtaining part, the white balance coefficient and the edge enhancement coefficient being related to each other such that one of the coefficients changes depending on a change in other one of the coefficients when taking a noise of the image arising due to one of the white balance adjustment and the edge enhancement processing in consideration; and
   an image processing part performing the white balance adjustment using the white balance coefficient and performing the edge enhancement processing using the edge enhancement coefficient.

2. The image processing apparatus according to claim 1, wherein:
   said image processing part performs an intermediate processing between the white balance adjustment and the edge enhancement processing; and
   said coefficient determining part determines the white balance coefficient, the edge enhancement coefficient, and an intermediate processing coefficient according to the color temperature information such that the three coefficients are related to one another, the intermediate processing coefficient being used for performing the intermediate processing.

3. The image processing apparatus according to claim 1, wherein
   said coefficient determining part determines the edge enhancement coefficient by using a lookup table of the color temperature information.

4. A non-transitory computer-readable medium storing a computer program for causing a computer to control an image processing apparatus performing at least a white balance adjustment and an edge enhancement processing, the image processing apparatus comprising a light source characteristic obtaining part obtaining a light source characteristic which appears at the time an image to be processed is captured, the program comprising:
   determining a white balance coefficient used for performing the white balance adjustment and an edge enhancement coefficient used for performing the edge enhancement processing according to color temperature information calculated from the light source characteristic obtained by the light source characteristic obtaining part, the white balance coefficient and the edge enhancement coefficient being related to each other such that one of the coefficients changes depending on a change in other one of the coefficients when taking a noise of the image arising due to one of the white balance adjustment and the edge enhancement processing into consideration; and
   performing the white balance adjustment using the white balance coefficient and performing the edge enhancement processing using the edge enhancement coefficient.

5. An image processing method, comprising the steps of:
   a light source characteristic obtaining step obtaining a light source characteristic which appears at the time an image to be processed is captured;
   a coefficient determining step determining a white balance coefficient used for performing the white balance adjustment and an edge enhancement coefficient used for performing the edge enhancement processing according to color temperature information calculated from the light source characteristic obtained in the light source characteristic obtaining step, the white balance coefficient and the edge enhancement coefficient being related to each other such that one of the coefficients changes depending on a change in other one of the coefficients when taking a noise of the image arising due to one of the white balance adjustment and the edge enhancement processing into consideration; and
   an image processing step performing the white balance adjustment using the white balance coefficient and performing the edge enhancement processing using the edge enhancement coefficient.

6. The image processing apparatus according to claim 1, wherein
   said coefficient determining part determines the edge enhancement coefficient which is related to the white balance coefficient, according to both of the color temperature information and a characteristic of the image other than the color temperature information.

7. The image processing apparatus according to claim 6, wherein
said characteristic of the image other than the color temperature information is a contrast characteristic of the image.

8. The image processing apparatus according to claim 7, wherein
said coefficient determining part determines the edge enhancement coefficient by using a lookup table of the color temperature information and the contrast characteristic.

9. The image processing apparatus according to claim 2, wherein:
said intermediate processing is a smoothing processing; and
said intermediate processing coefficient is a smoothing processing coefficient.

10. The image processing apparatus according to claim 9, wherein
said coefficient determining part determines the smoothing processing coefficient by using a lookup table of the color temperature information and a contrast characteristic of the image.

* * * * *

UNITED STATES PATENT AND TRADEMARK OFFICE
CERTIFICATE OF CORRECTION

| | | |
|---|---|---|
| PATENT NO. | : 7,768,555 B2 | Page 1 of 1 |
| APPLICATION NO. | : 12/385545 | |
| DATED | : August 3, 2010 | |
| INVENTOR(S) | : Hideo Hoshuyama | |

It is certified that error appears in the above-identified patent and that said Letters Patent is hereby corrected as shown below:

On the Title page:

Item (73), should read --Nikon Corporation, Tokyo (JP)--.

Signed and Sealed this

Fifth Day of October, 2010

David J. Kappos
*Director of the United States Patent and Trademark Office*